United States Patent
Saigo

[19]
[11] Patent Number: 6,142,628
[45] Date of Patent: Nov. 7, 2000

[54] EYEGLASSES TRY-ON SIMULATION SYSTEM

[76] Inventor: Tsuyoshi Saigo, 13-11, Midorigaoka, 2-chome, Hamura-shi, Tokyo 205-0003, Japan

[21] Appl. No.: 09/297,721

[22] PCT Filed: Feb. 2, 1999

[86] PCT No.: PCT/JP99/00418

§ 371 Date: May 7, 1999

§ 102(e) Date: May 7, 1999

[30] Foreign Application Priority Data

Feb. 3, 1998 [JP] Japan ................... 10-036778

[51] Int. Cl.⁷ .................................................. A61B 3/00
[52] U.S. Cl. ........................................ 351/204; 351/216
[58] Field of Search ................................. 351/204, 200, 351/205, 216, 246, 227, 177

[56] References Cited

U.S. PATENT DOCUMENTS

| | | | |
|---|---|---|---|
| 5,576,778 | 11/1996 | Fujie et al. | 351/177 |
| 5,592,248 | 1/1997 | Norton et al. | 351/246 |
| 5,875,017 | 2/1999 | Ohnuma et al. | 351/205 |

FOREIGN PATENT DOCUMENTS

| | | |
|---|---|---|
| 62-262821 | 11/1987 | Japan . |
| 63-113674 | 5/1988 | Japan . |
| 5-35827 | 2/1993 | Japan . |
| 6-68214 | 3/1994 | Japan . |
| 6-139318 | 5/1994 | Japan . |
| 8-287139 | 11/1996 | Japan . |

*Primary Examiner*—George Manuel
*Attorney, Agent, or Firm*—Oliff & Berridge, PLC

[57] ABSTRACT

To enable the simulation of a state, which approximates an actual eyeglasses wearing state, by integrating previously-inputted prescription data, lens material data and lens design data, with selected frame shape data, enabling the easy and accurate determination of eyeglasses that are to one's liking. Provides more information relative to frame data, and makes selection easier by using a multi-media catalog comprising photographs of frames and frame-related text and audio. Further, facilitates selection by actively introducing a pair comparison and selection screen, which compares side-by-side 2 of the same eyeglasses try-on screens, which display selected eyeglasses.

25 Claims, 28 Drawing Sheets

FIG.3

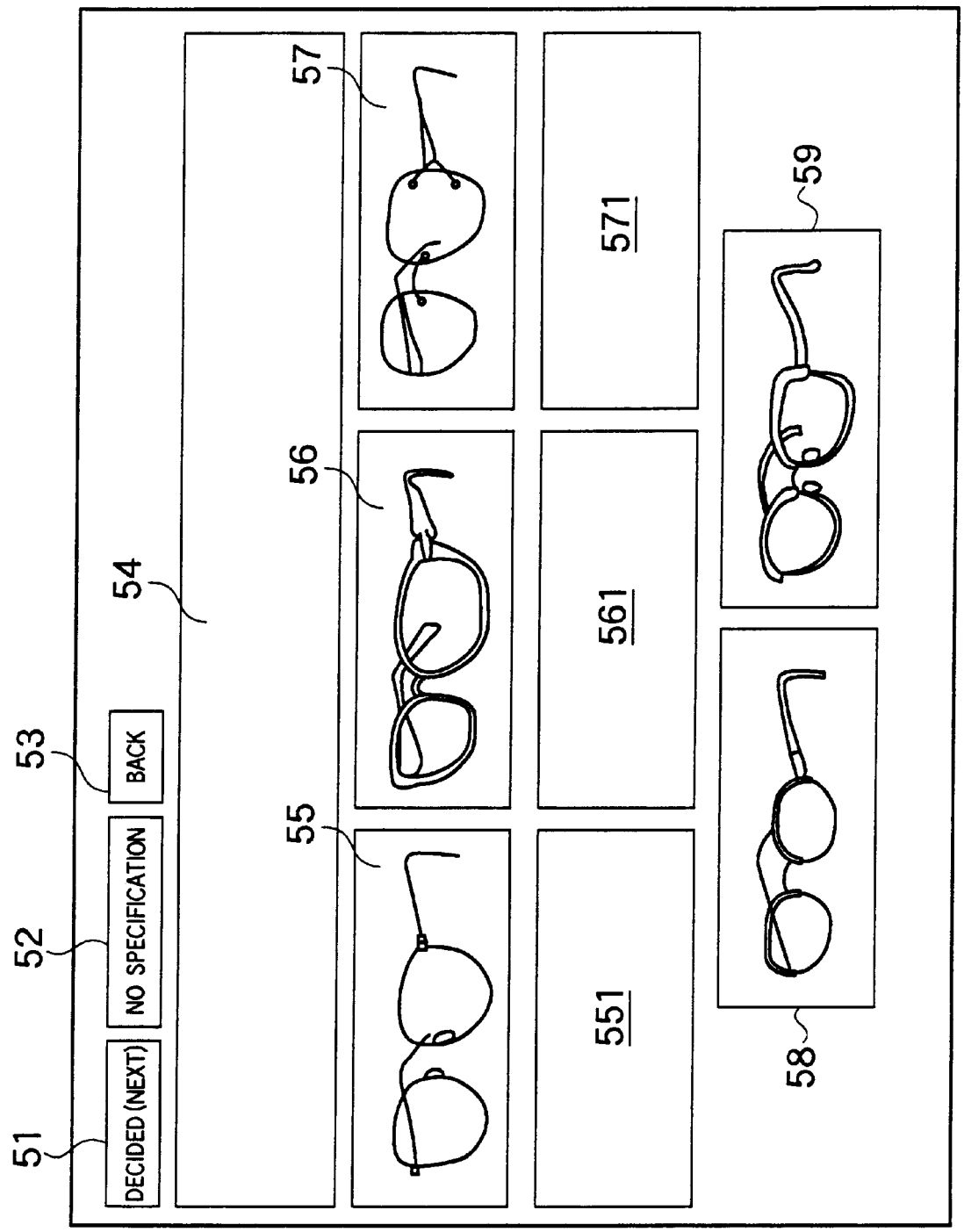

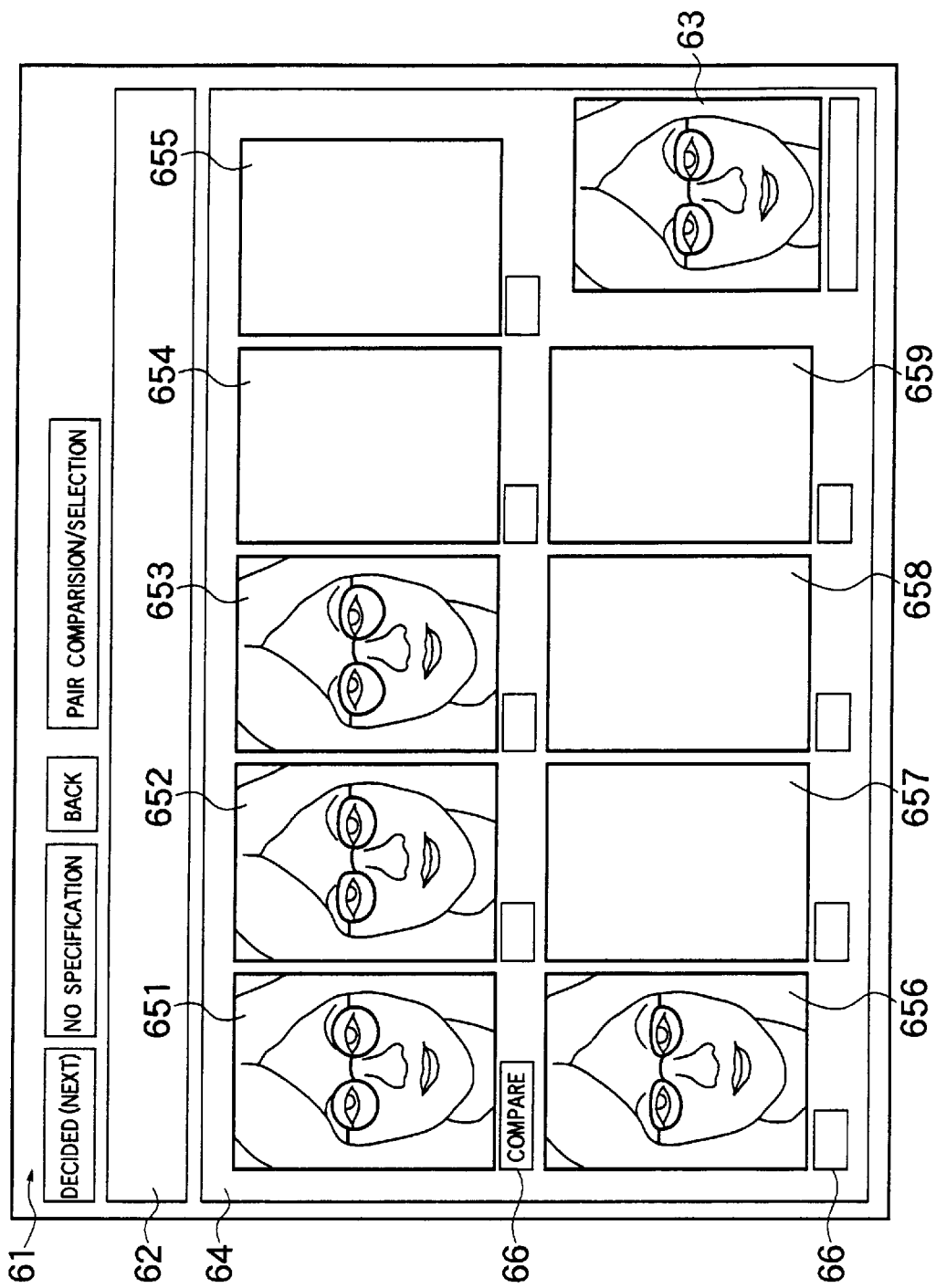

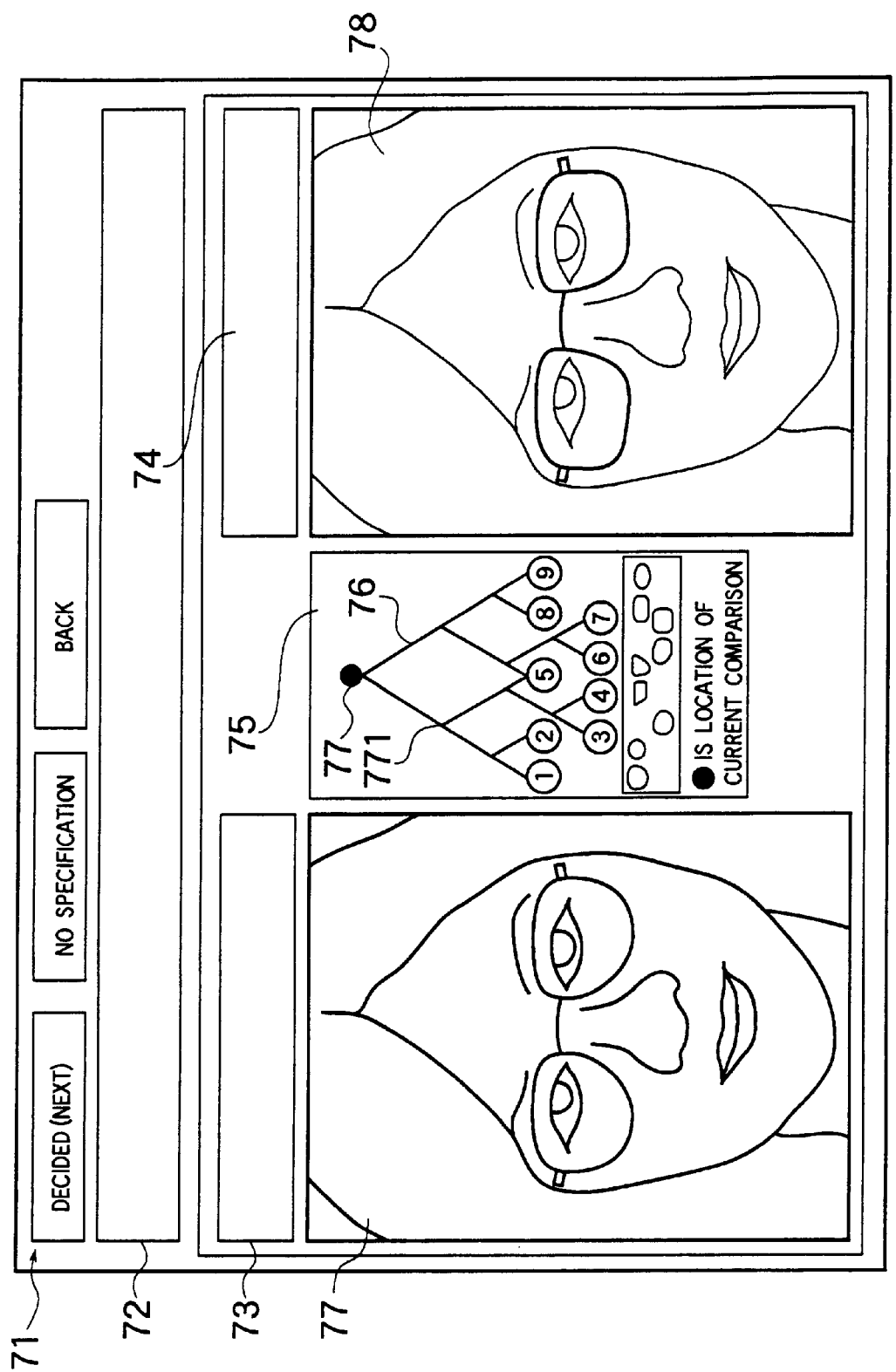

FIG.8

[DECIDED (NEXT)] [NO SPECIFICATION] [BACK]

— FRAME PRICE RANGE SELECTION —

SELECT A FRAME PRICE RANGE TO YOUR LIKING. WHEN NOT SPECIFYING [A PRICE RANGE], CLICK ON THE "NO SPECIFICATION" BUTTON.

— PRICE RANGES —
- ○ UP TO 10,000 YEN
- ○ UP TO 15,000 YEN
- ● UP TO 20,000 YEN
- ○ UP TO 25,000 YEN
- ○ UP TO 30,000 YEN
- ○ UP TO 50,000 YEN
- ○ UP TO 70,000 YEN
- ○ UP TO 100,000 YEN

INPUT (CLICK ON) A FIGURE, AND CLICK ON THE "CONFIRM" BUTTON.

[CHANGE LOWER LIMIT] [CHANGE UPPER LIMIT]
[CHANGE LOWER LIMIT] ~ [CHANGE UPPER LIMIT]

[1] [2] [3]
[4] [5] [6]
[7] [8] [9]
[0] [000]

[CURRENTLY INPUTTED NUMERIC VALUE]

[CONFIRM]

[SPECIFIED PRICE RANGE]
●

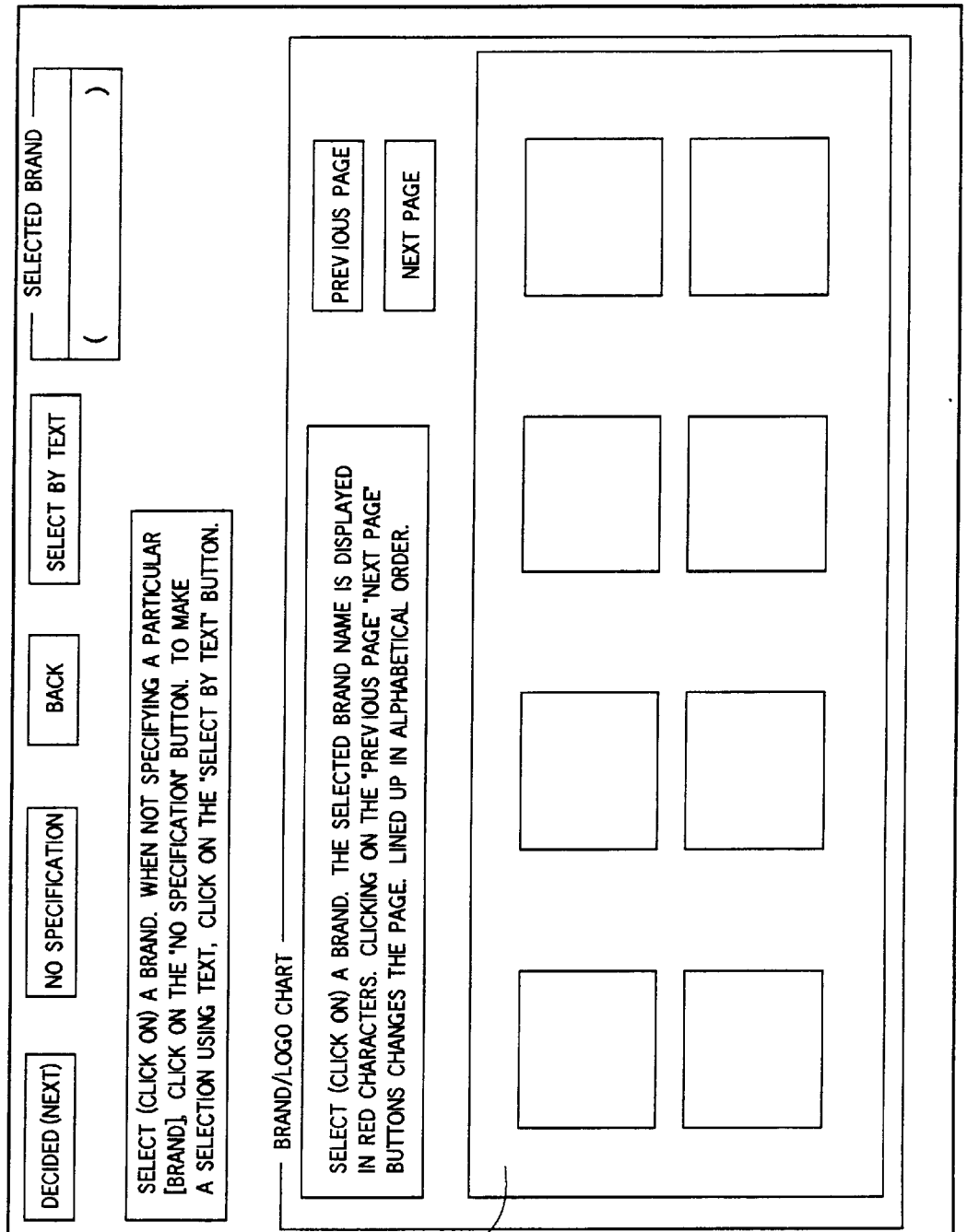

FIG.10

[DECIDED (NEXT)] [CANCEL ALL] [BACK]

TO SPECIFY A SELECTION CONDITION, CLICK ON THE "SPECIFY" BUTTON. THE SPECIFIED FUNCTION IS DISPLAYED IN RED CHARACTERS. WHEN NOT SPECIFYING [A CONDITION], CLICK ON THE "CANCEL" BUTTON. WHEN NOT SPECIFYING ANYTHING, CLICK ON THE "CANCEL ALL" BUTTON.

●SPECIFY SPRING HINGE

INCORPORATING A SPRING INSIDE THE HINGE HELP FRAMES RETAIN SHAPE, AND PRODUCES A SOFT, COMFORTABLE FIT.

SPECIFY SUPER-ELASTIC (SHAPE-MEMORY-EFFECT) FRAME

SPECIFY SUNGLASS FUNCTION

SPECIFY METAL ALLERGY MEASURES

SPECIFY BEJEWELED

SPECIFY GOLD FRAME

FIG.17

LENS THICKNESS/WEIGHT COMPARISON CHART

- CLICKING ON THE "SELECT" BUTTON OF A DESIRED LENS (LENS A-H) DISPLAYS THE LENS SHAPE.
- 2 TYPES OF LENSES CAN BE SELECTED AND COMPARED.
- TO CHANGE A LENS, CLICK ON THE "CHANGE" BUTTON OF THE LENS TO BE CHANGED, AND THEN CLICK ON THE "SELECT" BUTTON OF THE LENS TO BE SELECTED ANEW.

| | | NORMAL | | SLIGHTLY THIN | | THINNER | | THINNEST | |
|---|---|---|---|---|---|---|---|---|---|
| | | SPHERICAL SURFACE LENS A | ASPHERICAL SURFACE LENS B | ASPHERICAL SURFACE LENS C | ASPHERICAL SURFACE LENS D | ASPHERICAL SURFACE LENS E | ASPHERICAL SURFACE LENS F | SPHERICAL SURFACE LENS G | ASPHERICAL SURFACE LENS H |
| | | FIRST CHANGE | SELECT | SELECT | SELECT | SELECT | SELECT | SELECT | SECOND CHANGE |
| NORMAL PROCESSING | THICKNESS (mm) RIGHT LENS | 3.1 | 3.0 | 3.0 | 2.9 | 2.9 | 2.9 | 2.7 | 2.7 |
| | LEFT LENS | 5.0 | 4.7 | 4.5 | 4.3 | 4.2 | 4.1 | 3.8 | 3.6 |
| | WEIGHT (g) RIGHT LENS | 6.0 | 5.8 | 5.5 | 5.4 | 5.5 | 5.5 | 5.6 | 5.5 |
| | LEFT LENS | 9.4 | 8.8 | 8.1 | 7.7 | 7.8 | 7.6 | 7.6 | 7.2 |
| THIN TYPE PROCESSING | THICKNESS (mm) RIGHT LENS | 2.6 | 2.7 | 2.6 | 2.6 | 2.6 | 2.6 | 2.5 | 2.6 |
| | LEFT LENS | 3.8 | 3.9 | 3.6 | 3.7 | 3.5 | 3.6 | 3.3 | 3.4 |
| | WEIGHT (g) RIGHT LENS | 5.0 | 5.1 | 4.7 | 4.8 | 4.9 | 5.0 | 5.1 | 5.2 |
| | LEFT LENS | 7.1 | 7.2 | 6.5 | 6.6 | 6.6 | 6.6 | 6.6 | 6.7 |

LENS SHAPE AS SEEN FROM ABOVE

LEFT LENS — RIGHT LENS

NORMAL PROCESSING: LENS A

THIN TYPE PROCESSING: LENS H

FIG. 28

EYEGLASSES TRY-ON SIMULATION SYSTEM

TECHNICAL FIELD

The present invention relates to an eyeglasses try-on simulation system, which displays an eyeglasses-wearing composite image composed of an eyeglasses frame image relative to a portrait of a person, who is not wearing eyeglasses, that is, which enables eyeglasses to be tried on in a virtual mode, and more particularly to an eyeglasses try-on simulation system, which is constituted so as to enable the easy and accurate determination of an eyeglasses frame and eyeglass lens that are to the liking of an eyeglasses wearer.

BACKGROUND ART

Simulation systems for people who wear eyeglasses have been known for some time now. For example, Japanese Patent Laid-open No. 61-80222 proposes a system, which uses a video camera to film an image of a person, specifies the eyeglasses area in that image as a square framework display, and creates a composite image by superimposing an eyeglasses frame in this area. Further, Japanese Patent Laid-open No. 63-76581 proposes a system, which determines the ratio of the photographic magnification on a composite image of a person and an eyeglasses frame by comparing an actual measurement of PD (pupil distance) and an actual measurement on the image.

However, with the simulation systems disclosed in the above-mentioned Japanese Patent Laid-open No. 61-80222 and Japanese Patent Laid-open No. 63-76581, it is difficult to compare and study the wearing states of various eyeglasses frames on the screen at the same time, and operation is also complicated. Further, these systems only [simulated] a wearing state of an eyeglasses frame, and did not enable comparison of states wherein actual prescription lenses are mounted in the eyeglasses, and were not capable of comparative simulation for determining optimum eyeglasses that satisfy such conditions as light weight, good appearance, and the like.

Further, there has also been proposed a method, wherein a computer selects, based on a previously determined design rule, a lens shape that suits the shape of the face of an eyeglasses wearer. But this method was not able to sufficiently reflect the preferences of an eyeglasses wearer.

With the foregoing in view, an object of the present invention is to provide an eyeglasses try-on simulation system, which is capable of simulating a state, which takes eyeglasses lenses into consideration, and more closely approximates the actual wearing of eyeglasses, and which enables an easy and accurate determination of eyeglasses that are to one's liking.

A further object of the present invention is to provide an eyeglasses try-on simulation system, which enables judgments to be made on the determination of eyeglasses based on abundant, easy-to-understand eyeglasses frame information. A further object of the present invention is to provide an eyeglasses try-on simulation system, which enables the easy creation and selection of a lens shape to one's liking, while confirming an eyeglasses wearing state.

DISCLOSURE OF THE INVENTION

To achieve the above-mentioned objects, the present invention adopts the following constitutions. An eyeglasses try-on simulation system of the present invention (Constitution 1) is characterized in that it comprises a function for capturing and displaying on a display screen as image data a portrait of a person, who is not wearing glasses; a function for selecting an arbitrary eyeglasses frame from among eyeglasses frame data, comprising images of a plurality of types of eyeglasses frames stored in advance; a function for composing an eyeglasses frame image of the above-mentioned selected eyeglasses frame and the above-mentioned portrait image, and for displaying on the above-mentioned display screen a composite image on which the eyeglasses frame is simulated; and a lens selecting support function for computing, on the basis of previously-inputted lens prescription data, lens material data, and lens optical design data, a lens shape state when a lens is placed into the above-mentioned selected eyeglasses frame, and for displaying the results of the computation thereof as lens shape data in accordance with either a numeric value or a graphic. Lens shape data in accordance with either a numeric value or a graphic comprises, for example, lens thickness data in accordance with a numeric value, and lens external appearance and shape in accordance with a graphic. In particular, by displaying as lens shape data information in accordance with either a numeric value or a graphic related to the thickness of a lens peripheral portion (edge) when a lens is placed into a frame, it is possible to learn the appearance and so forth of a lens when viewed from the side. Consequently, a simulation, which approximates the state in which actual eyeglasses are worn, can be achieved, and the optimum eyeglasses can be selected. Furthermore, shape data of an eyeglasses frame (rim, end piece, temple, and other such shape and dimensional data in accordance with either a numeric value or a graphic) can be included and displayed with lens shape data.

As an aspect of the above-described Constitution 1, (Constitution 2) is characterized in that it is possible to display side-by-side on the above-mentioned display screen the above-mentioned composite image, and lens shape data in accordance with the above-mentioned lens selecting support function, and furthermore, it is also possible to display on the above-mentioned display screen the weight of a lens computed in accordance with the above-mentioned lens selecting support function.

Since a composite image and lens shape data are displayed side-by-side on a display screen, a comprehensive judgment can be made when deciding on eyeglasses. Further, since the lens weight is also displayed on the display screen, a decision concerning eyeglasses that are to one's liking can be made from the standpoint of weight as well, making possible the selection of optimum eyeglasses.

As an aspect of the above-described Constitution 1, (Constitution 3) is characterized in that it comprises a function for displaying on the above-mentioned display screen a lens value in accordance with the degree of lens surface treatment processing.

Since a lens value that accords with the degree of lens surface treatment, such as an anti-reflective coating (the presence or absence, and grade (difference of light transmittance, and difference of interference color of coating film) of surface treatment) is immediately known, lens selection can be performed quickly from a plurality of standpoints. When a value, that accords with the extent of an anti-reflective coating applied to a lens surface, is displayed, it is desirable to also display an image that indicates the state of transmittance in accordance with the extent of the anti-reflective coating.

As an aspect of the above-described Constitution 1, (Constitution 4) is characterized in that a plurality of lens shape data, computed in accordance with a lens selecting support function based on the above-mentioned lens prescription data, lens material data, and lens optical design data, can be displayed on the above-mentioned display screen.

Since data of a plurality of lens shapes can be compared and contrasted by being displayed on a display screen, a desired eyeglass lens can be quickly and easily selected.

As an aspect of the above-described Constitution 1, (Constitution 5) is characterized in that a plurality of composite images, in which a plurality of selected eyeglasses frames are each simulated on the above-mentioned portrait, can be displayed side-by-side on the above-mentioned display screen.

When composite images wearing a plurality of eyeglasses are displayed side-by-side on a display screen in this manner, the differences in image that the respective frames impart to the portrait can be readily seen, and compared and contrasted, making it easy to select eyeglasses that are to the eyeglasses wearer's liking.

As an aspect of the above-described Constitution 1, (Constitution 6) is characterized in that it comprises a guidance screen, which acts as a guide to the overall flow of system operations, comprising the above-mentioned eyeglasses frame selection operation up until a desired eyeglasses are selected.

When a guidance screen like this exists, even when a person ordering eyeglasses is not familiar with this system, he can operate [the system] easily on his own, and can decide on eyeglasses that are to his liking.

As an aspect of the above-described Constitution 1, (Constitution 7) is characterized in that it comprises a measuring function for displaying by superimposing over the above-mentioned portrait on the above-mentioned display screen, on which is displayed the above-mentioned portrait of a person who is not wearing eyeglasses, a scale display image, by which the distance in the direction of the face width of the above-mentioned portrait can be read, and for obtaining face width data from this display screen. Face width, pupil distance and other face width data is used, for example, to avoid selecting a frame that is either extremely large or small, and/or to determine the composition ratio between a frame and the portrait on the display screen.

As an aspect of the above-described Constitution 1, (Constitution 8) is characterized in that it comprises a facial surface processing function in accordance with image processing relative to a portrait on the above-mentioned display screen.

Facial surface processing is various processing for obscuring or hiding wrinkles and blemishes, and/or to correct the color of a face to make the face look beautiful and natural. More specifically, processing, which obscures or hides wrinkles and blemishes, is performed, for example, by dividing the surface of the face into tiny areas, and revising the color within each area to a mixed color that equalizes the color at a plurality of points within the area thereof.

As an aspect of the above-described Constitution 8, (Constitution 9) is characterized in that image processing in accordance with the above-mentioned facial surface processing function is not performed for the eyes and mouth. By not performing facial surface processing on the eyes and mouth like this, processing can be performed while fully retaining the facial characteristics of the eyeglasses wearer.

As an aspect of the above-described Constitution 1, (Constitution 10) is characterized in that it comprises a review function screen for displaying and examining at least frame type, frame lens shape, and frame price, on a screen, which is selected in accordance with a function, which selects the above-mentioned eyeglasses frame, and which is displayed on the above-mentioned display screen. Since frame type, frame lens shape, and frame price are displayed simultaneously on a screen, a multifaceted, comprehensive judgment can be easily made in deciding on an eyeglasses frame by examining an eyeglasses frame on the basis of the frame data thereof.

As an aspect of the above-described Constitution 1, (Constitution 11) is characterized in that it comprises a screen, which graphically displays lens layout data, which is determined by eyeglasses specifications.

As lens layout data, the optical center location, the eyepoint location, far vision zone(distance zone) and near vision zone(reading zone) layouts, the location of the hole for mounting frame parts to a lens, and the like can be cited. Since layout data is displayed graphically, a layout state can be confirmed visually.

As an aspect of the above-described Constitution 1, (Constitution 12) is characterized in that it comprises an order placing function for processing an order placement, comprising eyeglasses frame data, and lens data processing instructions required for manufacturing eyeglasses after eyeglasses specifications have been determined.

Further, an eyeglasses try-on simulation system of the present invention (Constitution 13) is characterized in that it comprises a function for capturing and displaying on a display screen as image data a portrait of a person, who is not wearing glasses; a function for selecting an arbitrary eyeglasses frame from among eyeglasses frame data, comprising images of a plurality of types of eyeglasses frames stored in advance; a function for composing an eyeglasses frame image of the above-mentioned selected eyeglasses frame and the above-mentioned portrait image, and for displaying on the above-mentioned display screen a composite image on which the eyeglasses frame is simulated; and a function for performing image processing, which adds, relative to the transmittance image of a lens portion of the above-mentioned composite image, an external appearance effect in accordance with prescription lens refraction. By adding an external appearance effect (an effect that shows the enlarging or shrinking of the eye and the peripheral portion thereof in accordance with refraction resulting from a lens) in accordance with refraction that accords with the strength of a prescription lens, it is possible to simulate in a real manner an actual try-on state of eyeglasses incorporating prescription lenses. Therefore, an eyeglasses wearer is able to make an accurate decision regarding eyeglasses that meet his expectations.

Furthermore, the state of transmittance in accordance with the grade of a lens surface anti-reflective coating can also be added as an external appearance effect.

Further, an eyeglasses try-on simulation system of the present invention (Constitution 14) is characterized in that it comprises a function for capturing and displaying on a display screen as image data a portrait of a person, who is not wearing glasses; a function for selecting an arbitrary eyeglasses frame from among eyeglasses frame data, comprising images of a plurality of types of eyeglasses frames stored in advance; and a function for composing an eyeglasses frame image of the above-mentioned selected eyeglasses frame and the above-mentioned portrait image, and for displaying on the above-mentioned display screen a composite image on which the eyeglasses frame is simulated, and the above-mentioned eyeglasses frame data is called from a multimedia catalog, and comprises, in addition to an eyeglasses frame image of a selected eyeglasses frame, text data and voice data related to the selected eyeglasses frame.

Since [an eyeglasses wearer] not only looks at an image of an eyeglasses frame, but can also become acquainted with an eyeglasses frame by reading a text and listening to a voice that explains the product, even an ordinary eyeglasses wearer can accurately, and in an easy-to-understand manner, learn about the characteristics and so forth of an eyeglasses frame, enabling the quick and easy selection of eyeglasses. Furthermore, as an eyeglasses frame image, it is desirable to use an oblique view of an entire frame, and an enlarged view of the portion in the vicinity of the end piece since this enables [an eyeglasses wearer] to get a rough idea of an eyeglasses frame using a small number of screens.

Further, an eyeglasses try-on simulation system of the present invention (Constitution 15) is characterized in that it comprises a function for displaying on a display screen a composite image, in which an eyeglasses frame, selected from among eyeglasses frame data comprising a plurality of eyeglasses frame images, is simulated on a portrait of a person, who is not wearing eyeglasses, and the above-mentioned plurality of eyeglasses frames are categorized on the basis of categories of lens shapes.

As an aspect of the above-mentioned Constitution 15, (Constitution 16) is characterized in that the above-mentioned lens shape categories are categorized in accordance with the number of circular elements, which constitute the contour of a lens shape.

This system proposes a classification method, wherein, based on an analysis [indicating] that the beauty of a shape is contained in a circle (or a collection of circular arcs), the shape of a lens is categorized by the number of circular elements that constitute the contour of the lens shape. Here, the number of circular elements refers to the number of circles or circular arcs (including a line segment as well) when the contour of a lens shape is treated as the line that links a circle or circular arc (including a line segment as well). For example, when a lens shape is deemed to be a circular shape, the number of circular elements is 1, and when a lens shape is made up of portions that are deemed to be 2 circular arcs, the number of circular elements is 2. Based on this novel lens shape classification method (type concept), a lens shape (such as, for example, a Boston shape, or a Wellington shape) is categorized using an appropriate classification number, and then, in accordance with selecting a desired lens shape from among lens shapes categorized in this manner, a composite portrait image wearing an eyeglasses frame of the selected lens shape is displayed, making it possible to ascertain immediately via a display screen the effect that the lens shape has on the wearer.

As an aspect of the above-mentioned Constitution 15, (Constitution 17) is characterized in that 2 composite images wearing eyeglasses frames of different lens shapes selected from the above-mentioned plurality of eyeglasses frames are displayed side-by-side on the above-mentioned display screen, enabling an eyeglasses frame of a lens shape that is to one's liking to be selected while comparing and contrasting these 2 composite images.

Since 2 composite images wearing eyeglasses frames of different lens shapes can be compared and contrasted side-by-side on a display screen, an [eyeglasses] wearer can readily select a lens shape that is to his liking, and can select a desired pair of eyeglasses in a short period of time.

As an aspect of the above-mentioned Constitution 15, (Constitution 18) is characterized in that a systematic diagram of a tree structure, which represents the categories of the above-mentioned lens shapes, is displayed on the above-mentioned display screen, and the 2 lens shapes being displayed in the above-mentioned 2 composite images are displayed in the above-mentioned systematic diagram so as to be recognizable.

As an aspect of the above-mentioned Constitution 15, (Constitution 19) is characterized in that it is constituted so that, of the plurality of above-mentioned lens shapes currently selected, the 2 lens shapes that always differ the most as to the shape of the lens and/or shape-imparted image are compared and contrasted.

As an aspect of the above-mentioned Constitution 15, (Constitution 20) is characterized in that either images of eyeglasses frames of a plurality of basic lens shapes, which are categorized in accordance with the above-mentioned lens shape categories, or a plurality of composite images, in which the above-mentioned eyeglasses frames of a plurality of basic lens shapes are simulated on the above-mentioned portraits, respectively, are displayed side-by-side on the above-mentioned display screen, and furthermore, in accordance with selecting either one of the above-mentioned images of eyeglasses frames of a plurality of basic lens shapes, or one of the above-mentioned plurality of composite images, there is displayed a composite image, on which is simulated eyeglasses frames of a plurality of lens shapes, which are further subdivided for each basic lens shape.

Further, an eyeglasses try-on simulation system of the present invention (Constitution 21) is characterized in that it comprises a function for displaying side-by-side on a display screen a composite image screen, which simulates a rimless frame on a portrait of a person, who is not wearing eyeglasses, and a transformation operation screen for transforming the lens shape of the above-mentioned rimless frame; and a function for transforming, in accordance with the lens shape transformation operation in the above-mentioned transformation operation screen, the lens shape of the above-mentioned composite image in response thereto. Since a composite image that simulates a rimless frame, and a lens shape transformation operation screen are side-by-side on a display screen, and the lens shape of the composite image is transformed in response to the lens shape transformation operation, a transformation operation in accordance with the lens shape transformation operation screen is easy to understand, and has outstanding operability, and furthermore, the wearing state following lens shape transformation can be immediately observed via the composite image.

As an aspect of the above-mentioned constitution 21, (Constitution 22) is characterized in that the transformation in accordance with the above-mentioned lens shape transformation operation is a cutting transformation, wherein a portion of a lens is transformed by cutting in accordance with either a curved line or a straight line relative to the above-mentioned rimless frame lens shape image, which is displayed on the above-mentioned transformation operation screen.

As an aspect of the above-mentioned constitution 21, (Constitution 23) is characterized in that the transformation in accordance with the above-mentioned lens shape transformation operation comprises transformation that accompanies the movement of a vertex position of a curved line, which constitutes the above-mentioned lens shape contour, transformation that accompanies the expansion and contraction of the above-mentioned curved line, or transformation in accordance with the enlargement or reduction of the above-mentioned lens shape.

As an aspect of the above-mentioned constitution 21, (Constitution 24) is characterized in that the transformation in accordance with the above-mentioned lens shape transformation operation is an image transformation, which transforms a currently selected lens shape by composing the lens shape thereof and the lens shape of a specified image using a desired ratio.

As an aspect of the above-mentioned constitution 21, (Constitution 25) is characterized in that it comprises a contour correcting function, which is capable of highlighting and correcting the above-mentioned lens shape contour.

BRIEF DESCRIPTION OF THE DRAWINGS

FIG. 2 through FIG. 28 are diagrams showing display screens, which display the contents of respective processing in the system of FIG. 1.

BEST MODE FOR CARRYING OUT THE INVENTION

Figure 1:
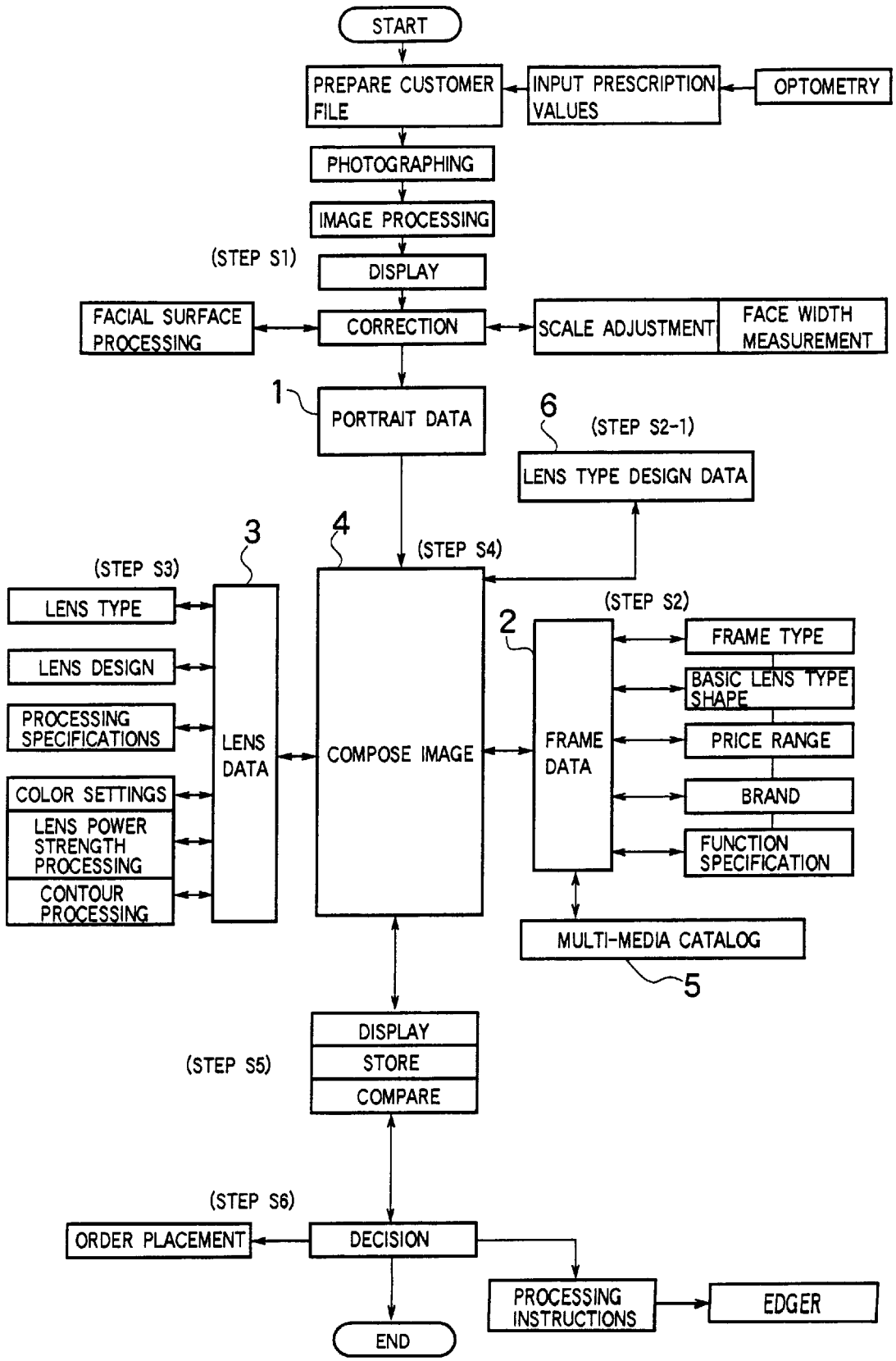
FIG. 1 is a flowchart showing an overview of an eyeglasses try-on simulation system related to an embodiment of the present invention.

FIG. 1 is a flowchart showing an overview of an eyeglasses try-on simulation system related to an embodiment of the present invention, and FIG. 2 through FIG. 28 are diagrams showing display screens, which display the contents of respective processing in the system of FIG. 1. Hereinbelow, the eyeglasses try-on simulation system of this embodiment is described with reference to these figures. The basic hardware configuration constituting this system is the same as those disclosed in Japanese Patent Laid-open No. 61-80222, Japanese Patent Laid-open No. 62-280717, Japanese Patent Laid-open No. 63-113671, and Japanese Patent Laid-open No. 1-76362, and is constituted from a portrait photographing device, frame data, computer, and display device (display) (not shown in the figures). A hardware configuration that differs from conventional systems uses a digital camera in the portrait photographing device, and the computer utilizes inputting means comprising a mouse. Further, frame data uses a multimedia catalog, which combines image data, text data, and voice data, and efforts are being made to enhance operability and data capacity, and to further enhance interactiveness.

Further, in FIG. 1, portrait data 1 preparation (Step S1), frame data 2 preparation (Step S2), lens data 3 preparation (Step S3), multimedia catalog 5 usage (Step S2), lens shape design data 6 preparation (Step S2-1), and image composition 4 (Step S4) are processing portions, which are characteristic of this embodiment. Hereinbelow, basic operating procedures are described on the basis of a display screen for each process.

(Step S1)

In the portrait data 1 preparation step, first, a customer file of a person, who visits an eyeglasses store to place an order for eyeglasses (a customer), is prepared. At this time, a lens prescription in accordance with an optometry of an optometrist is inputted. Next, a portrait of the customer not wearing eyeglasses is taken with a digital camera, and read into the computer, following which, portrait data is prepared by displaying [the portrait] on a display screen, and taking scale measurements, and, as needed, performing facial surface processing (beauty processing). A digital camera is utilized for portrait photography due to the diversity of post-photography image processing technologies [available therewith], but [portrait photography] is not particularly limited to a digital camera.

In this embodiment, after photography, image data of the portrait read into the computer is displayed one time on the display, and, while interacting with the customer, beauty processing is performed relative to this display screen, and scale measurements are taken in order to compose the portrait image and an eyeglasses frame image.

Figure 2:
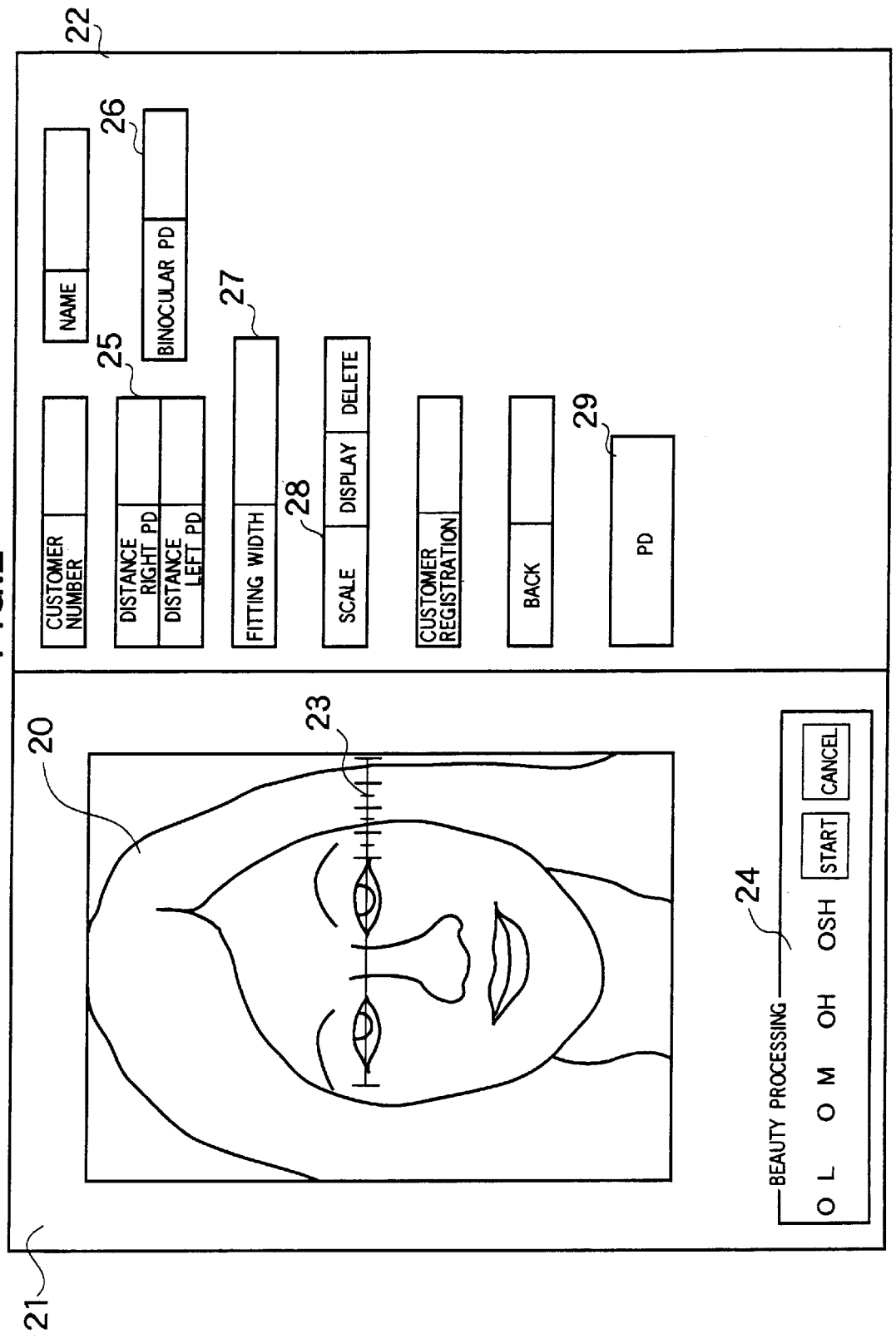

FIG. 2 is the display screen thereof. A facial image 20 is displayed against a sky blue background in the screen 21 on the left side, and the screen on the right side 22 constitutes the screen for inputting and displaying characters and numeric values, such as a customer's name, facial measurement data and so forth. Furthermore, beauty processing buttons are arranged in the area 24 below the facial image 20 of the left-side screen 21. The beauty processing buttons are constituted from beauty processing "Start" and "Cancel" operation buttons, and specification buttons "L," "M," "H," and "SH," which specify the degree of beauty processing.

This beauty processing function is peculiar to the present invention, and is a function, which performs beautification image processing on a facial image 20, and which is used, for example, to simulate a face which cosmetically hides wrinkles and blemishes. The screen processing technology therefor, for example, divides the area of the face into subdivided areas, and processes [these subdivided areas] as mixed colors that equalize the facial color within the divided areas thereof, and the degree of beauty processing changes in accordance with the extent of the subdividing setting. Since this system [is used] to select [an eyeglasses] frame while looking closely at one's own image, imaged by conscientiously enlarging portions [of the face] that are not seen in much detail on a day-to-day basis, the aim of carrying out beauty processing is to achieve an effect which lessens in advance the psychological shock thereof. However, this embodiment adopts a technique, which retains originality by excluding the mouth and eyes from beauty processing in accordance with masking. This is so beauty processing is performed while sustaining the characteristics of one's original face.

In the right-side screen 22 of FIG. 2, numerical display areas for facial measurement data are provided. There is an area 25 for inputting numeric values of distance zone PD for the right and left eye, individually, an area 26 for inputting a numeric value for binocular PD, and a numeric value inputting area 27 for fitting width (face width). When determining a fitting width, clicking on the "Display" button of the scale button 28 portrays a scale image 23 in the facial image 20 of the left-side screen 21, making it possible to measure the face width by reading the distance from this scale image 23. The measurement value on the measured face width image is used as position and expansion/contraction data for composing a facial image and an eyeglasses frame image. Further, clicking on the "Delete" button of the scale button 28 enables the scale image 23 to be deleted. Furthermore, clicking on the location of the right and left eye in the facial image 20 after clicking on the "PD" button 29 measures the PD value on the screen. If this on-screen PD value is compared to an actual PD measured value, a synthetic magnification for the screen can be computed, making it possible to determine composite screen data for the facial image 20 and the frame image of the frame data.

Figure 3:
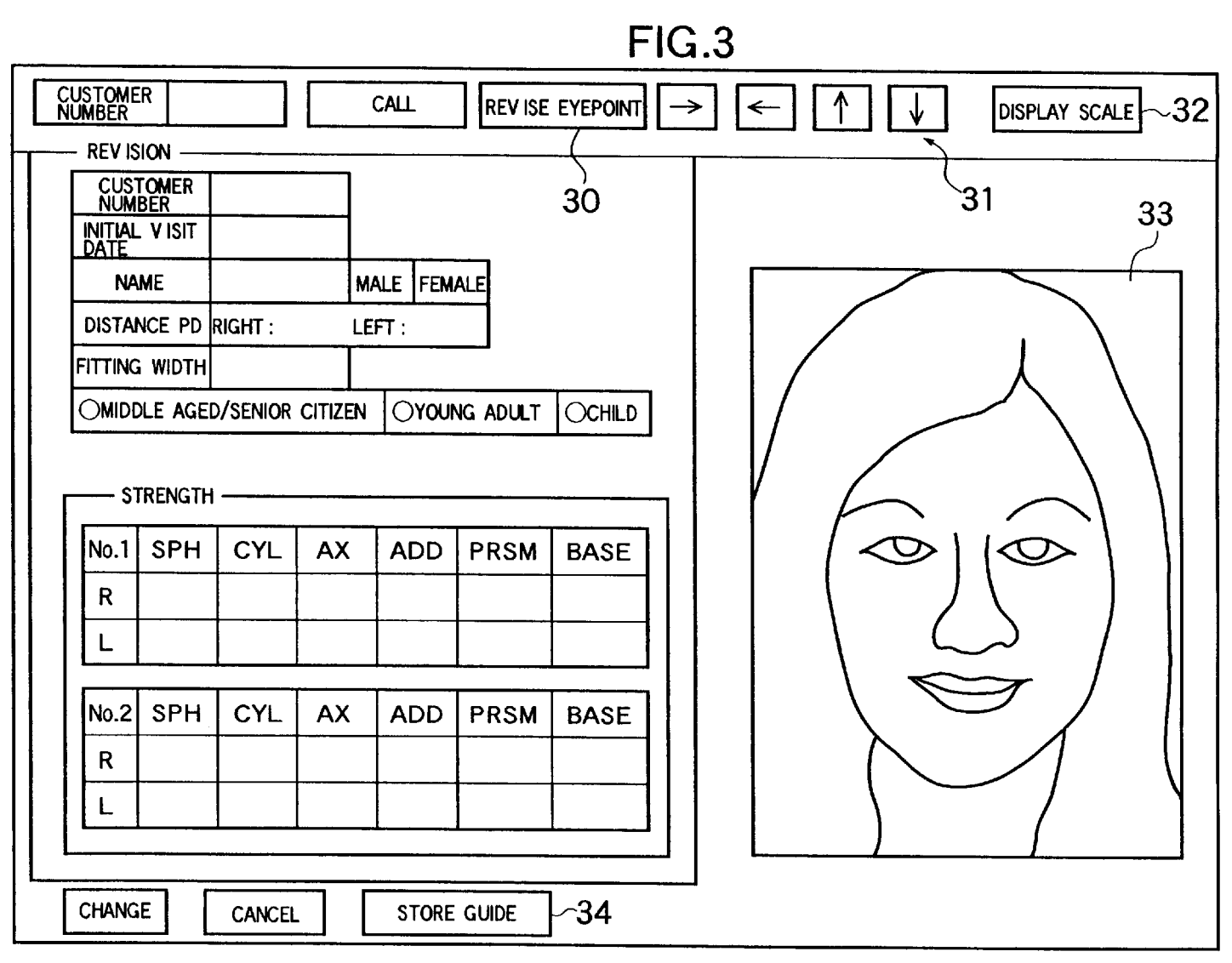

FIG. 3 is the administrative screen of the eyeglasses store, which runs this system, and is not shown to the customer. The main portion of this screen is the prescription inputting screen. Inputted data is stored in a database, and the next time the same customer visits the store, the inputted data is retrieved from the database, thus making it possible to omit photographing and other steps. Further, revisions and additions are also possible with this screen. In describing the screen of FIG. 3, it is possible to input a customer number, the date a customer first visited the store, which serves as a visitation history, a customer's name, sex, distance zone PD (pupil distance), visual acuity in the left and right eyes, fitting width, and age bracket (child, young adult, middle aged). Further, it is also possible to input a customer's left and right lens prescription data, such as SPH (meaning spherical strength), CYL (meaning astigmatism strength), AX (meaning astigmatism axis), ADD (meaning additional strength), PRSM (meaning prism) and BASE (meaning the base direction of the prism). Unnecessary items regarding a lens prescription can be left blank.

Further, the screen PD measurement performed on the screen of FIG. 2 is also possible with this screen. Clicking on the "Eyepoint Correction" button 30 in the upper portion of the screen, and using the arrow buttons 31 to move a cross mark appearing on the face screen 33 to the right, left, up or down makes it possible to input a location. Furthermore, clicking on the "Scale Display" button 32 enables a face width measurement like that of FIG. 2. Clicking on the "Store Guide" button 34 after completing portrait data preparation moves [the system] to the next frame selection screen.

(Step S2)

Figure 4:
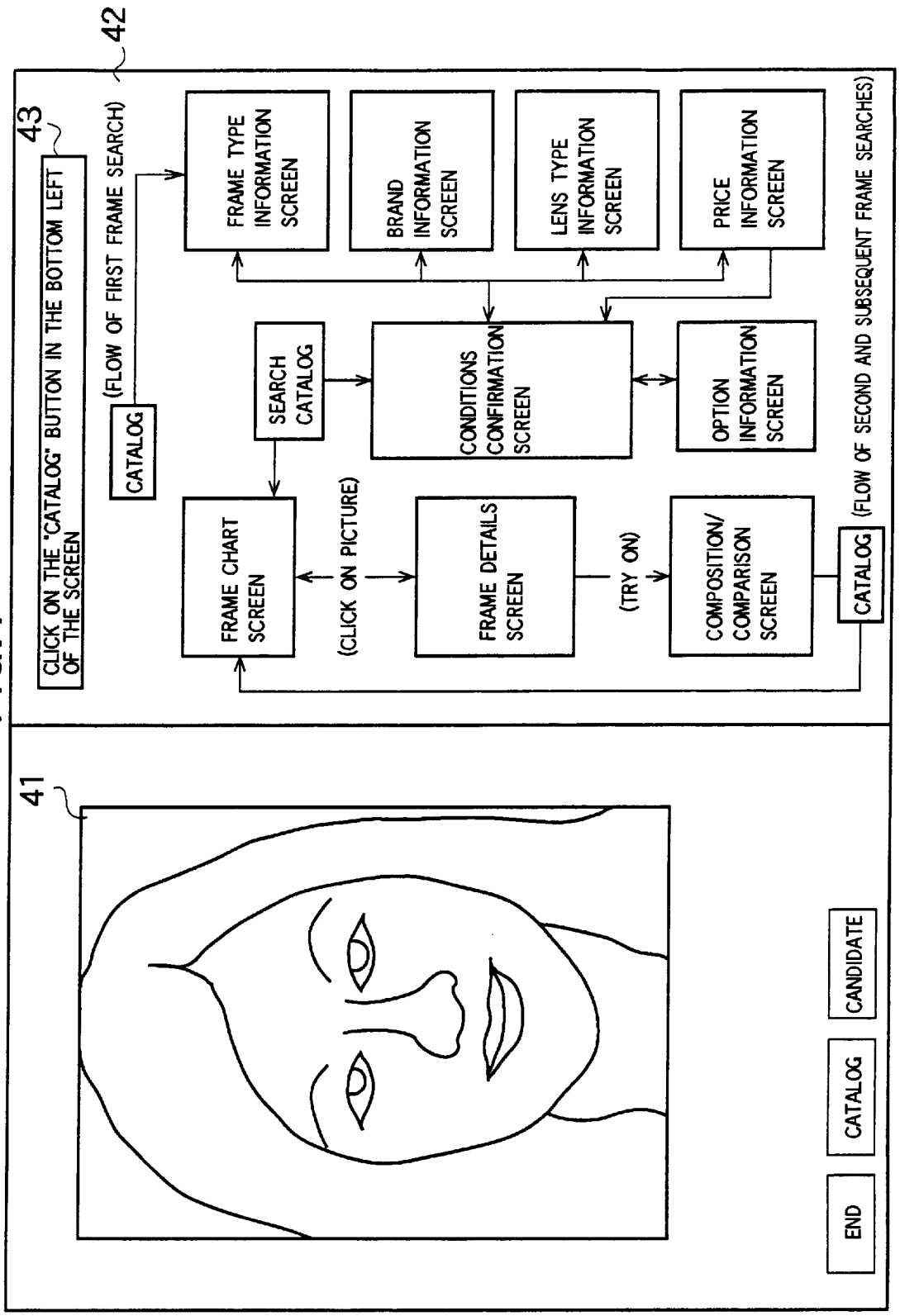

An overview of frame data 2 preparation is as shown in FIG. 1, and, beginning with FIG. 4, [the system] switches over to screens that are operated by the customer himself. First, the photographed portrait screen 41 is displayed on the left side, and in the right-side screen 42, in order to guide [a customer] through the basic flow of the operations that are about to commence, there is displayed a guidance screen, which acts as a guide while displaying miniature screens of screens that will be shown henceforth, and indicating via arrows the flow of these miniature screens.

Therefore, it becomes possible for an operator to check out his own portrait, and to grasp the flow of upcoming selection operations, providing an effect, which enables a basic understanding of the simulation system. Furthermore, the guidance screen of FIG. 4 serves as a guide to operations for deciding on an eyeglasses frame that is to one's liking, but a guidance screen comprising the below-described lens shape design method, by which [a customer] designs a lens shape on his own, or a guidance screen of the lens shape design method alone.

Further, in the area 43 in the upper portion of the right-side screen 42, an operation guidance message is displayed, and a guidance message appears on all screens hereinafter. FIG. 5 is a frame type (type) screen, and in the upper portion of the screen, there is an operation button area having a "Decided (Next)" button 51, a "No Specification" button 52, and a "Back" button 53, and in the bottom portion thereof is a frame type area. In the guidance screen 54 in the top portion of the frame type area, "Click on the picture of the frame type you like," "Selected type is indicated in red characters," "When not specifying a particular [frame type], click on the "No Specification" button," and other messages are displayed. And at the bottom of the guidance screen 54, oblique views of 5 types of frames are displayed. The 5 types of frames are categorized as to frame material and shape characteristics, and comprise a metal frame 55, plastic frame 56, rimless frame 57, nylon use half rim (rimron) frame (half-rim type) 58 and a combination frame 59.

Furthermore, for the typical metal frame 55, plastic frame 56, and rimless frame 57, explanatory messages appear in the areas 551, 561, 571 therebelow. For example, in the area 551 below the metal frame 55, there is an explanation stating "Standard eyeglasses frame, the main portion of the front part of the frame being made of metal."

FIG. 6, FIG. 7 are screens that describe a basic lens shape database, which forms the basis for categorization in accordance with the novel lens shape categories described hereinbelow.

In the area 61 in the upper portion of the screen in FIG. 6, 4 operation buttons are provided, "Decided (Next)," "No Specification," "Back," and "Select/Compare Two." (Furthermore, clicking on the "Select/Compare Two" operation button switches to the hereinbelow-described lens shape comparison screen (FIG. 7).)

Furthermore, beneath area 61 is a message area 62, which displays "Select (click on) the picture of the shape of frame you like," "When not specifying a particular [shape], click on the "No Specification" button," and "To compare, click on the "Compare" button, and select two frames." And then below the message area 62 are displayed a composite screen 63 of a face wearing the currently-selected lens shape (in this operation, a certain standard lens shape is selected in advance as a tentative lens shape) frame, and composite screens 651–659 of faces wearing respective lens shape frames, which have been classified by type into 9 basic types (In FIG. 6, a portion of the composite screens 651–659 have been omitted from the figure.). Furthermore, when any one of the composite screens 651–659 of faces wearing the 9 types of basic lens shape frames is selected, there appears a screen, which displays a plurality of composite images displaying lens shapes that further subdivide each basic lens shape. Further, beneath each composite screen 651–659, there is a "Compare" button 66, and it becomes possible to compare a pair of composite screens in accordance with making a selection by clicking on a "Compare" button 66.

FIG. 7 is a lens shape selection function screen for comparing a pair [of composite screens], and is a more detailed selection confirmation screen than the screen of FIG. 6. Comparison screens 77, 78 of 2 faces wearing eyeglasses of different lens shapes are provided on the left and right, and in the center screen 75, as a guide for recognizing and selecting the location of the currently-selected lens shape, is displayed a systematic diagram of a tree structure (Decision Tree) 76, which categorizes lens shapes. In accordance therewith, the shape characteristics of a lens shape are displayed in highlighted form, and an operator is guided toward a selection while being made aware [of these characteristics].

The system of this embodiment is designed to treat lens shape as the most important selection factor of frame selection. In this system, fundamental analysis of the shape of a lens is performed in advance, and based on this analyzed type concept, a plurality of basic lens shapes are selected, and categorized by lens shape.

Conventional lens shapes comprised the Paris shape, Semiauto shape, Boston shape, oval shape, hexagon shape, fox shape, eggplant shape, Wellington shape, Lexington shape, round shape, and octagon shape. But because of lens shapes for which there was no shape definition, and because the kinds of shapes were too numerous, it was not possible to establish an ideal classification.

With regard thereto, in this embodiment, as a method of classification based on analysis results which indicated that the beauty of a shape is found in a circle (or a collection of circular arcs), having a circle as the center of a basic shape, existing lens shapes were classified as to the extent to which circular elements are included therein. That is, since the contour of a lens shape can closely resemble a line that links a circle or circular arc (including a line segment), [a lens shape] is categorized by the number of circles or circular arcs (including a line segment) which are deemed to constitute a lens shape contour. For example, this is a classification method, wherein an oval-shaped lens is treated as having 1 circular element, and a squarish lens is treated as having 4 circular elements (a lens constituted from 4 portions considered circular arcs). And lens shapes were categorized into 9 shapes in all. (Furthermore, in the present invention, the number of categories is not limited to 9 shapes. For example, the number of categories can also be 7 shapes, 5 shapes, or 12 shapes.)

Further, as shown in FIG. 7, in this embodiment, as a method for selecting from a plurality of eyeglasses try-on screens, a "Pair Comparison Method", which compares and contrasts 2 eyeglasses try-on screens, is actively implemented. When there are simply too many screens to be compared, selection becomes perplexing, and a long time is required to make a selection (especially when the eyeglasses wearer himself is operating [the system] and making a selection), thus diminishing the practicality of this system for the eyeglasses store. Accordingly, in the screen of FIG. 7, screens 77, 78 are provided for comparing 2 selected eyeglasses try-on screens. In the area 71 in the upper portion of the screen on FIG. 7, there are a "Decided (Next)," a "No Specification," and a "Back" button, and in the area 72 therebelow, are displayed the messages "Select (click on) the picture of the frame type you like," and "When not specifying a particular [frame type], click on the "No Specification" button." Furthermore, in the areas 73, 74 above the screens 77, 78, are displayed messages describing the frames being simulated, for example, in area 73, "The lines stand out well, making for a soft, gentle image," and in area 74, "Squarish appearance produces a serious, down-to-earth image."

Furthermore, as a tool for streamlining selection even more, in the central screen 75 of FIG. 7, a decision tree 76 is provided. This tree 76 is designed so that a decision can be made in accordance with pair comparison having the central branch 77 as the starting point. Further, the pair comparison of this embodiment utilizes a method, which compares those lens shapes of the candidates of the point in time thereof which differ the most as to shape and image. That is, as shown in the figure, the method employed is such that lens shapes are arranged in the decision tree 76 in the sequence (1)–(9) in accordance with different lens shapes and images. First, at the central branch 77, the lens shape of (1) and the lens shape of (9) are compared on screens 77,78 and the lens shape of preference is selected. For example, when the lens shape of (1) is more to one's liking, next [the system] moves to branch 771, and the lens shape of (1) is compared against the lens shape of (5). The scope of lens shape selection is narrowed down in this manner.

FIG. 8 is a display screen for selecting the price range of an eyeglasses frame. In the past, purchase estimates were not used in a system like this, but because price is recognized as one of the important conditions for making a selection, this function screen is provided. Further, it is also possible to make a selection without specifying a frame price range, and to change a [price range] selection. FIG. 9 is a brand selection function screen. In this screen, only text and trademark information (brand, company name, and name of designer) are displayed, and capable of being selected. A brand specifies a frame manufacturer, and designer brand, and graphical marks, text and the like are displayed in the lower area 91. Further, it is also possible to make a selection without specifying a brand, and to change a [brand] selection.

Figure 11:
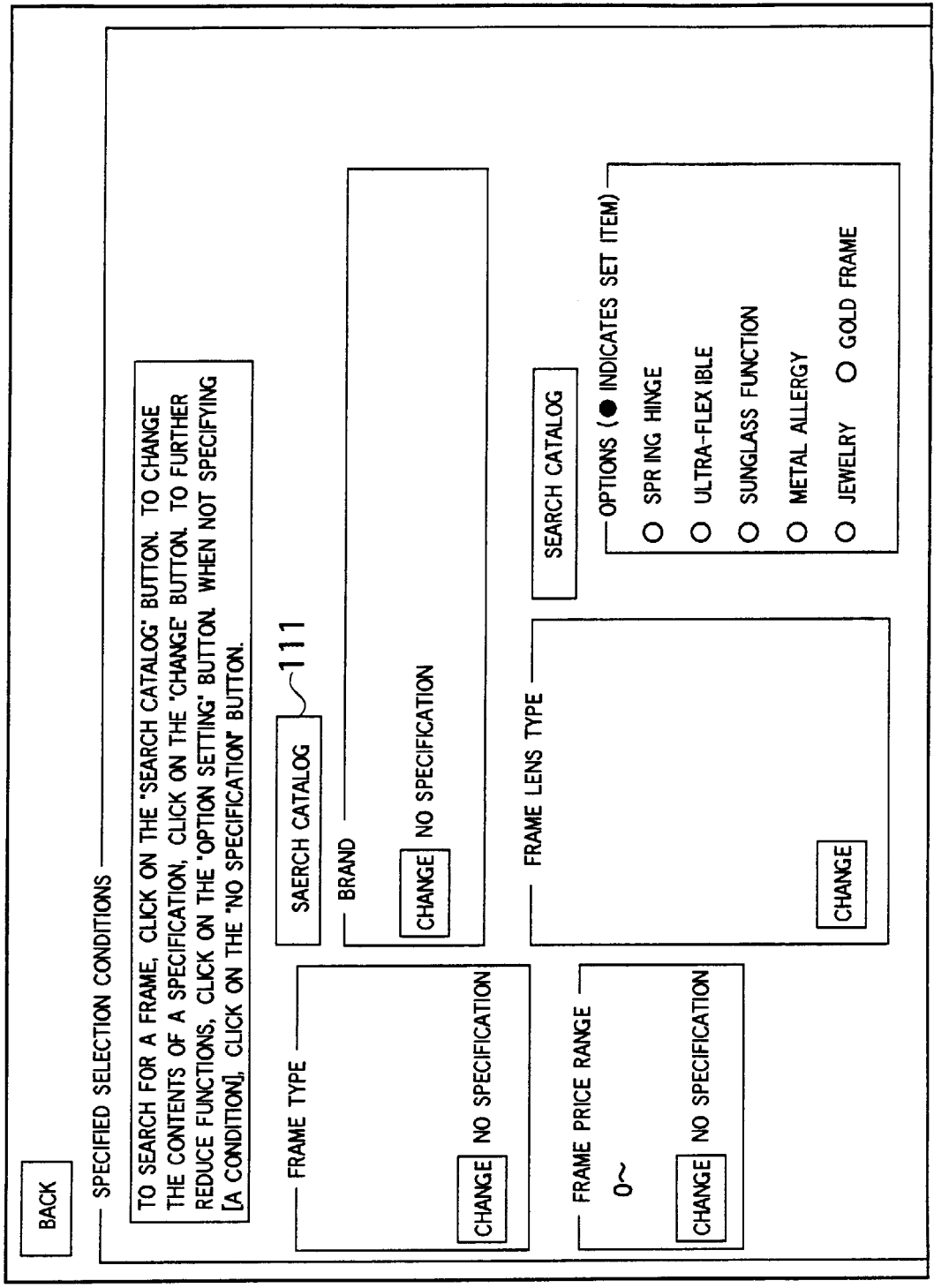

FIG. 10 is a screen that sets a frame-specific function (option), and makes it possible to select a spring hinge, an super-elastic (shape-memory-effect) frame, a sunglass function, a frame designed for people allergic to metal, a jeweled frame (jewelry), and a gold frame. In the screen of each function, an oblique view of a picture of the frame shape is displayed (In FIG. 10, diagrams of frame shapes are omitted.). The option setting displays in chart form items capable of being set, and displays as setting items frames categorized from the standpoints of structure, shape and frame function. A spring hinge specifies a hinge part of a peculiar function, ultra-flexible specifies a specific frame material, and sunglass function specifies a specific frame shape. A metal allergy [frame] functions to restrict frame properties for people who are allergic to specific metals, such as nickel, jewelry specifies a frame mounted with jewels, and gold frame refers to the specification of a frame of gold material. Further, it is also possible to make a selection without specifying these specific functions (options), and to add or change an [option] selection. FIG. 11 is a condition chart confirmation screen, and displays the above-described eyeglasses frame selection conditions, that is, kind of frame (type), frame price range, type of frame lens shape (shape), brand, and option (specific function). Since these frame selection conditions are displayed on the screen simultaneously, frame selection can be reviewed in a multi-faceted manner, making possible a comprehensive frame determination decision. If there are no changes upon confirming the above-described frame selection conditions, the "Search the Catalog" button 111 is clicked, and [the system] moves to frame catalog selection.

Figure 12:
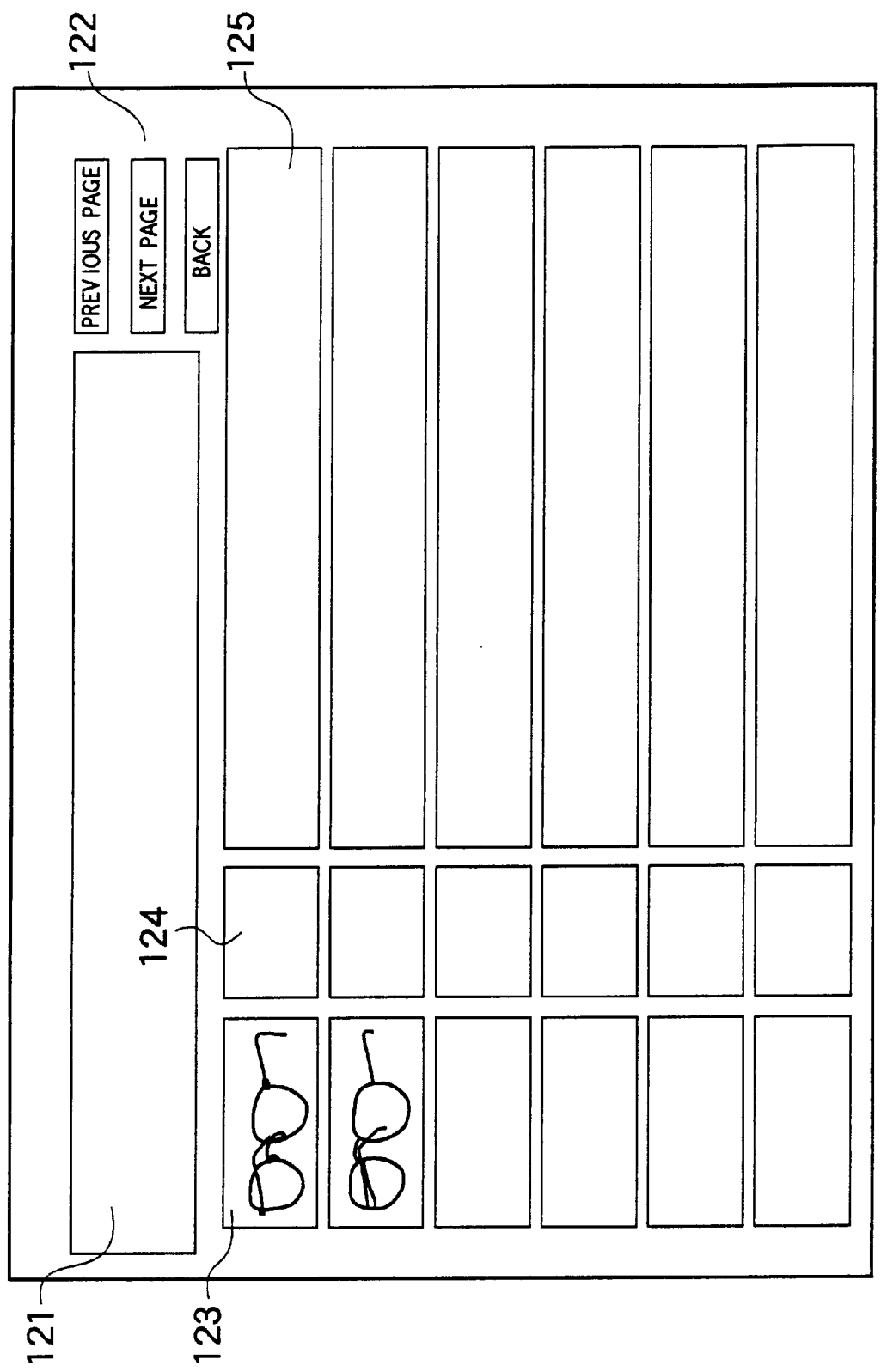

FIG. 12 is a function screen for collectively displaying frame charts selected on the basis of the above-mentioned selection conditions. In the upper area of this screen, there is a message screen 121, wherein is displayed "Clicking on the picture of the frame you would like to simulate enlarges the picture," "Clicking on 'Previous Page' 'Next Page' changes the page," and "To search using different conditions, click on the "Back" button." Further, in the area 122 to the left of the message screen 121, "Previous Page," "Next Page," and "Back" buttons are provided.

Further, below the message screen 121 is the candidate frame chart area. An oblique view picture of a frame is displayed in the area indicated by number 123, a price is displayed as text information in the area of number 124, and text information describing the characteristics of the frame thereof is displayed in the area of number 125, respectively. Below areas 123, 124, 125, other candidate frames are also displayed using the same format.

Figure 13:
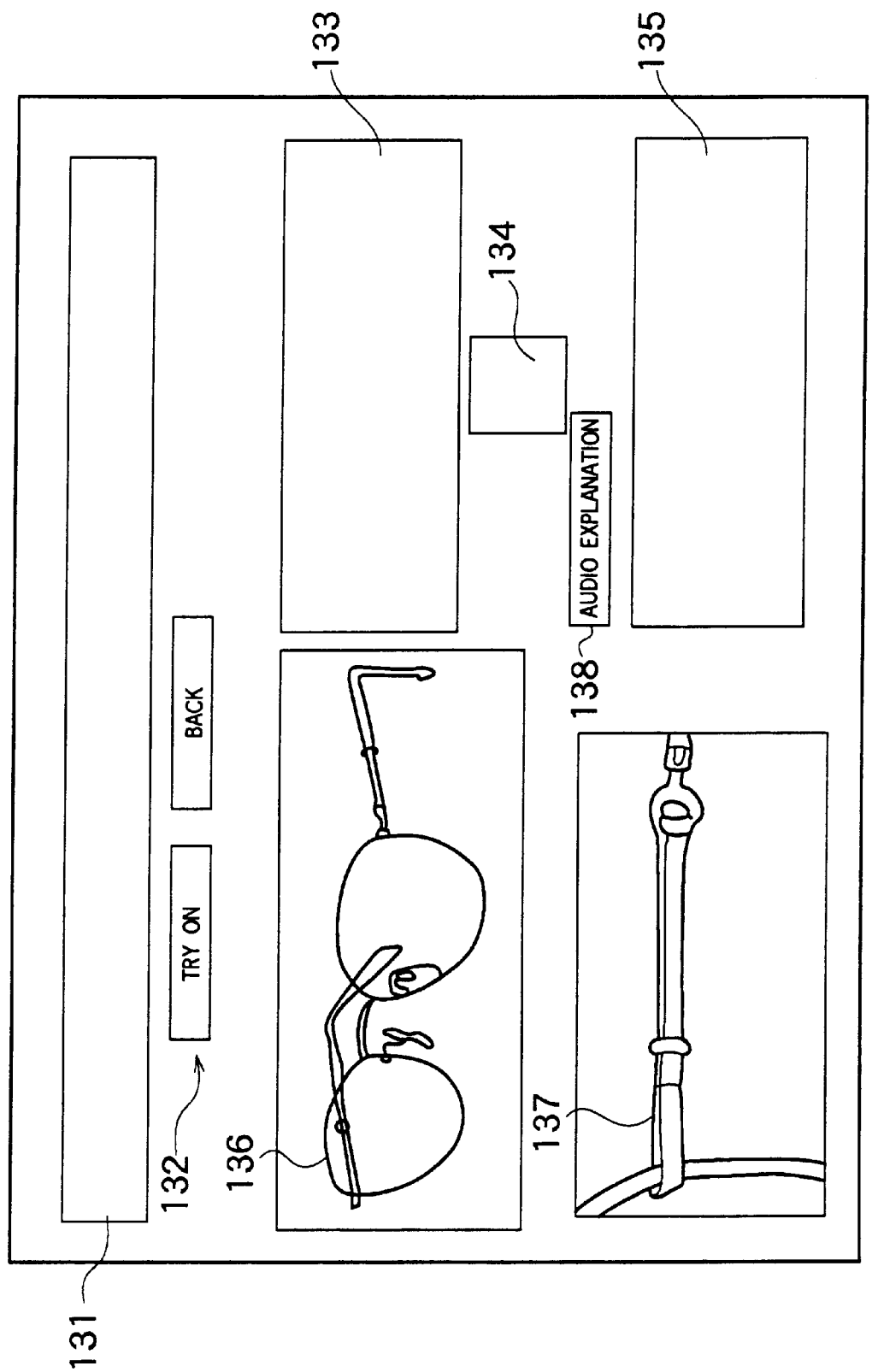

FIG. 13 is a catalog candidate frame screen specified from a candidate frame of FIG. 12, and as a function screen that constitutes a multi-media catalog, it is one of the characteristics of this embodiment.

The screen of FIG. 13 is a frame display screen, and displays a selected frame in accordance with various conditions. This screen is constituted from an overall oblique view 136, that enables an understanding of the overall impression made by a frame, an enlarged view of a portion [of the frame] in the vicinity of the end piece 137, and a textual commentary on the characteristics of the frame thereof. A product explanation of the frame is also provided in accordance with voice. To receive a voice explanation, simply press the "Voice Explanation" button 138. In a conventional system, there was only a frame image, but to make it easier to appreciate a frame, textual information and voice information have been added. In the area 131 in the upper portion of the screen, the messages "To try on a pair of eyeglasses, click on the "Try On" button," and "To return to the charts, click on the "Back" button" are displayed. In the area 132 therebelow, "Try On" and "Back" buttons are provided. Number 133 is a display area of a brand description, number 134 is a display area of a mark of the brand thereof, and number 135 is a display area of a frame description.

Figure 14:
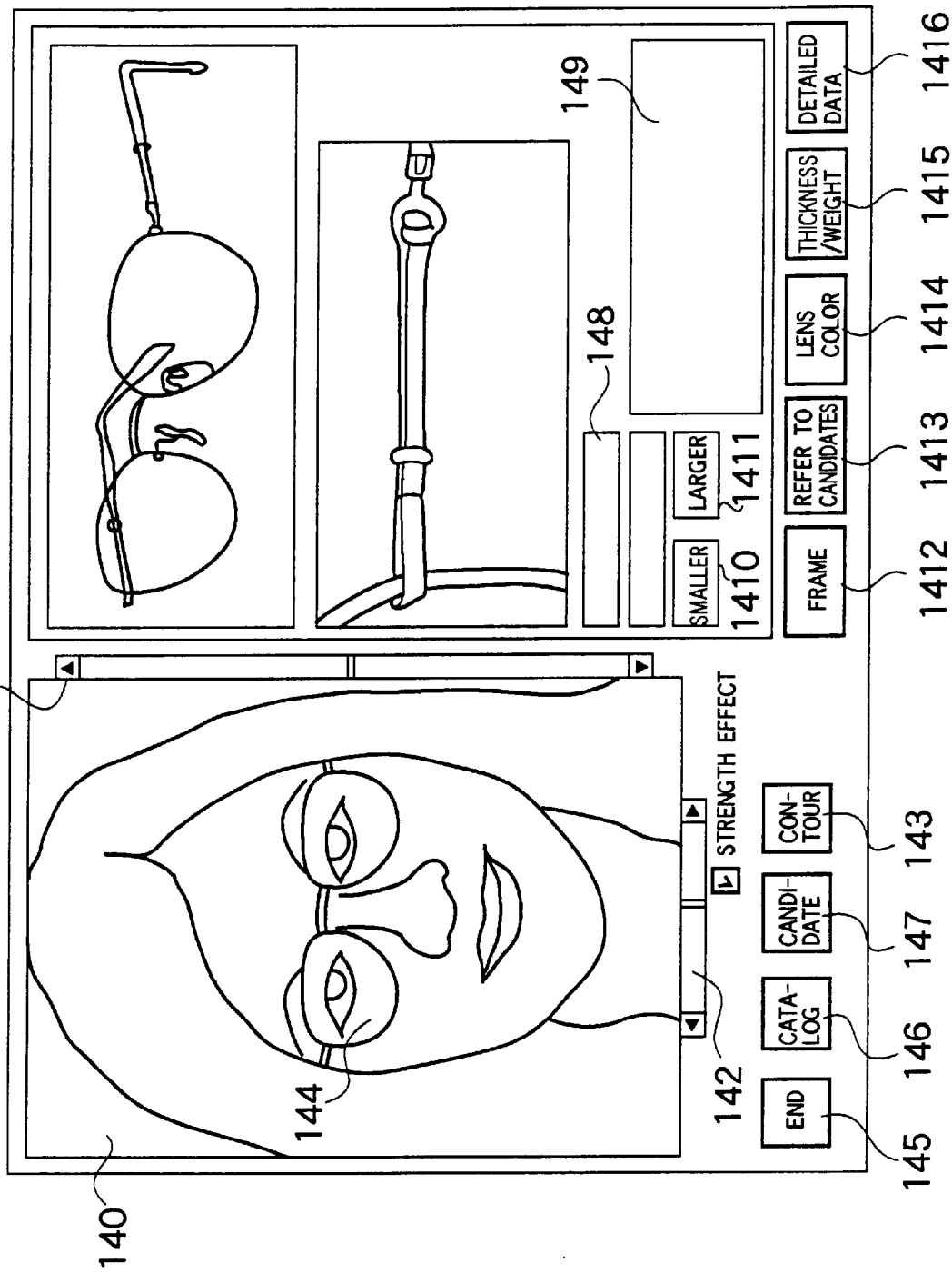

Further, in FIG. 13, other candidate frames can also be displayed as a divided screen, making comparison possible. FIG. 14 displays a try-on screen 140, in which a selected frame is tried on, and to the right side of the try-on screen 140, a picture of the frame being tried on is displayed in juxtaposition. Scroll bars 141, 142 are provided on the right edge and bottom edge of try-on screen 140, and in accordance with the operation of the scroll bars 141, 142, it is possible to adjust the position of a frame from the standard wearing position to the up-down direction, left-right direction. This position adjustment function is used for the purpose of confirming a fitting position when frame layout processing relative to a facial image of the try-on screen 140 does not go well.

Further, when a rimron frame or a rimless frame is selected, and the lens contour shape is difficult to see, the lens contour can be highlighted and corrected using a "Contour" button, which is indicated by number 143, and which corrects via coloring the intensity of a contour. Furthermore, in preparing the lens shape design data described hereinbelow, there is provided a contour correction function, which makes it possible to highlight and correct the contour of the lens shape thereof.

In the try-on screen 140 of FIG. 14, the lens portion 144 is an image that already includes the prescription lens power strength effect (external appearance effect). Further, in the bottom left portion of the screen of FIG. 14, 3 buttons are provided, an "End" button 145, a "Catalog" button 146, and a "Candidate" button 147. Pressing the "Catalog" button 146 returns [the system] to the frame chart screen of FIG. 12. Further, pressing the "Candidate" button (or the "Register as Candidate" button) 147 registers a frame that is to one's liking as a candidate, and stores it temporarily. Further, in the area below the frame screen in the right side of the screen, the area of number 148 displays a frame price, number 149 displays a textual description of the frame, and numbers 1410, 1411 are frame size modification buttons, which make it possible to specify "Smaller," "Larger," and to change and compose a frame size relative to a facial image of the try-on screen 140. Further, in the lower right edge of the screen of FIG. 14, function buttons of a "Frame" button 1412, a "Show Candidates" button 1413, a "Lens Color" button 1414, a "Thickness/Weight" button 1415, and a "Details" button 1416 are provided. Pressing the "Frame" button 1412 displays an enlarged image of a frame, the brand, and so forth, and pressing the "Details" button 1416 displays such information as frame brand, brand description, frame options, and the like.

Figure 15:
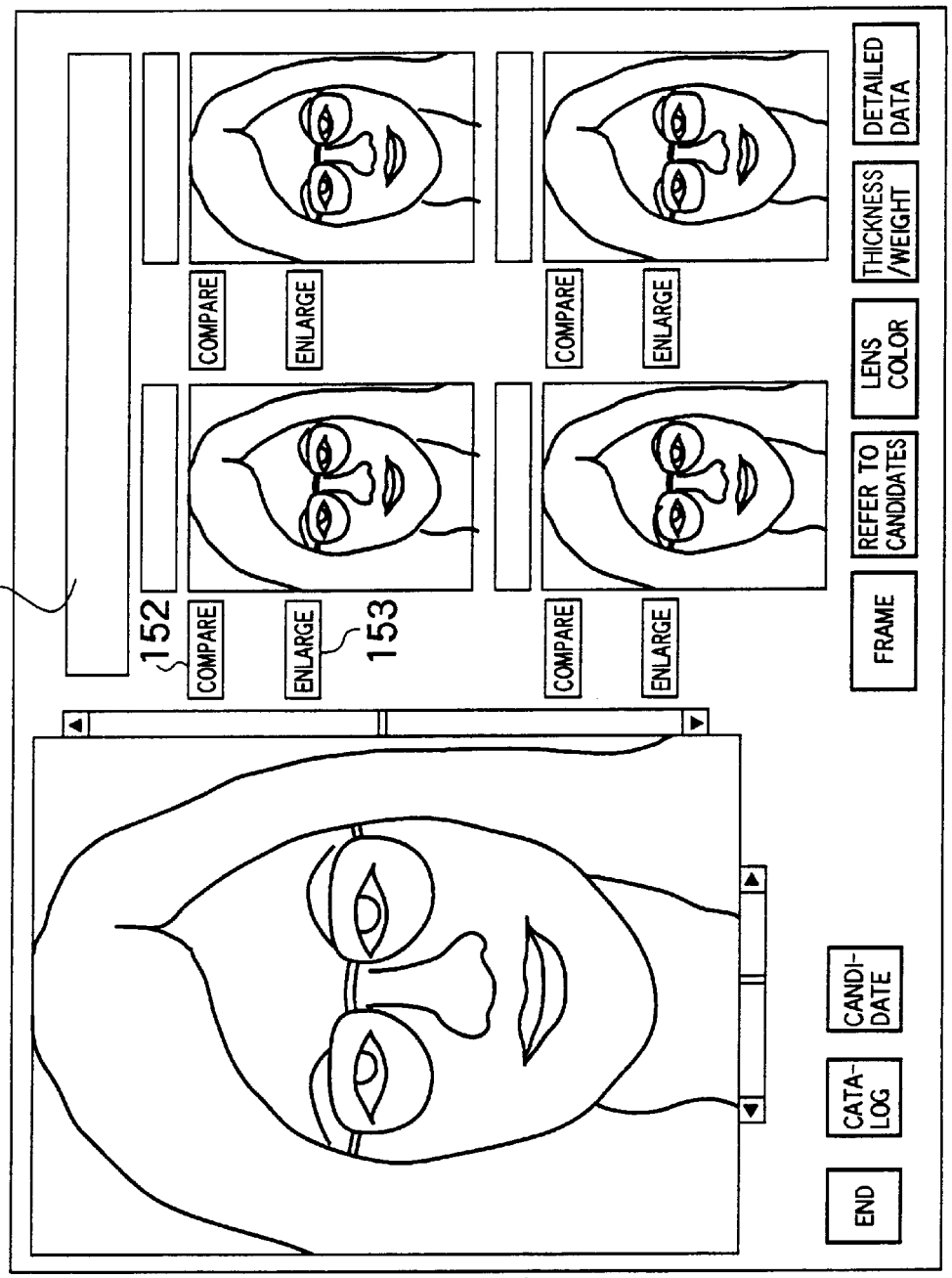

FIG. 15 is a diagram showing a screen displayed when the "Show Candidates" button 1413 of FIG. 14 and so forth is clicked. In the area 151 of the upper right side, messages such as "To compare, click on the "Compare" button, and select 2 [frames]," and "To enlarge [a composite image] on the left side, click on the "Enlarge" button" are displayed. The 4 screens (miniaturized try-on screens) of the right side of FIG. 15 are try-on screens [of the frames] selected as candidates thusfar, and to the left side of each screen, button 152 is a "Compare" button, and button 153 is an "Enlarge" button. Further, the comparison screen displayed when the "Compare" button is clicked constitutes a screen that incorporates the pair selection/comparison method explained in the lens shape comparison of FIG. 7.

(Step S3)

Figure 16:
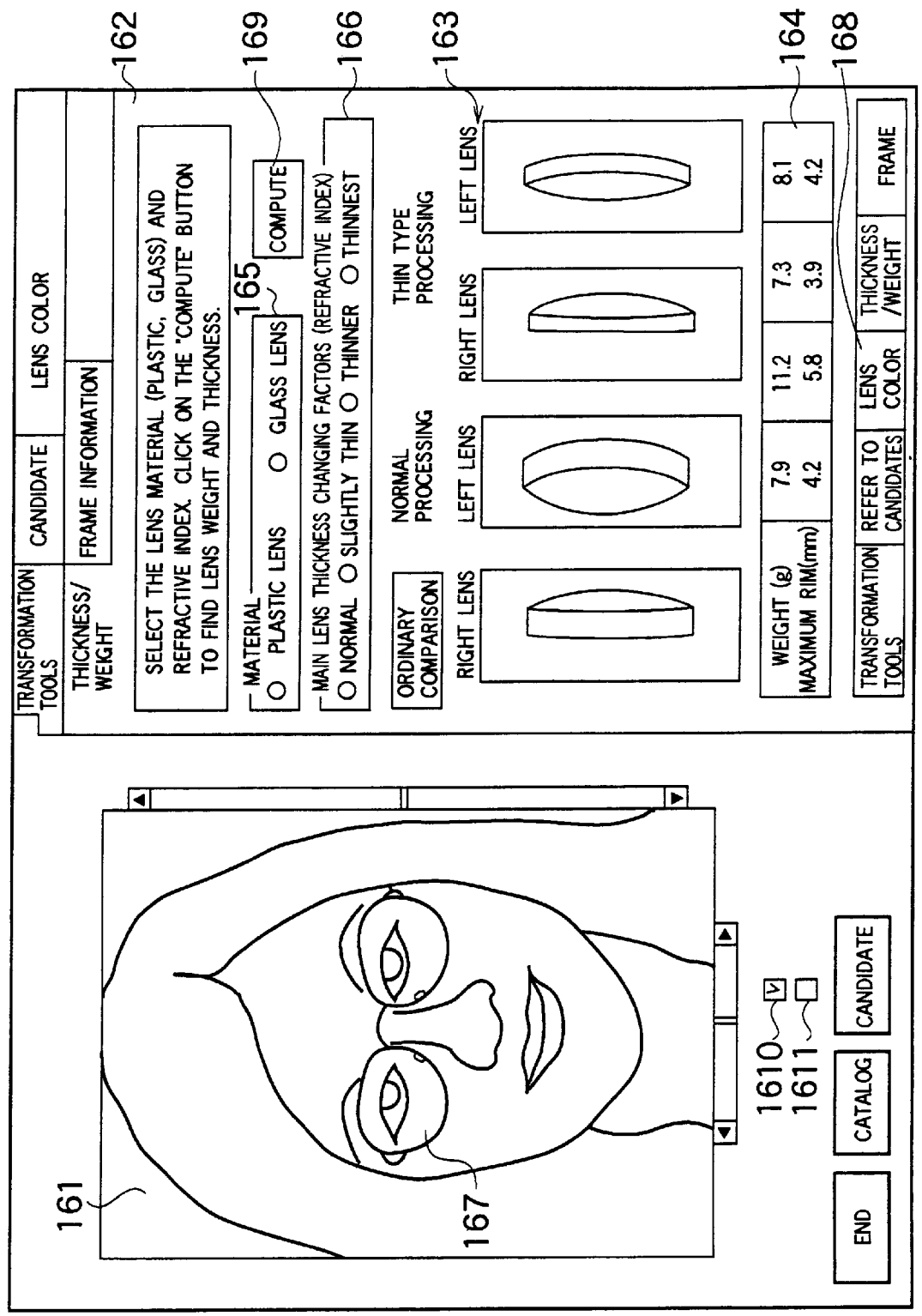

FIG. 16 is the screen displayed when the "Thickness/Weight" button 1415 of FIG. 14 and so forth is clicked, and comprises a lens selecting support function, which is one of the main characteristics of this embodiment. This lens selecting support function computes, based on previously-inputted prescription data, the lens refractive index, and lens optical design data (as required, specified processing conditions information) for a selected frame, the state of a lens shape after placing the lens in a frame, and from the computed results thereof, displays a numeric value of lens thickness data, and a graphic of the external shape of a lens.

In the area of the left side of the screen of FIG. 16 is displayed a try-on screen 161 showing a frame selected from the frame catalog in accordance with a frame simulation operation, and similar to FIG. 14, also comprises a function for adjusting the position of a frame image relative to a facial image in accordance with a scroll bar operation. Meanwhile, based on the above-mentioned lens selecting support function, the right side screen 162 comprises an area 163, which displays a graphic of a lens external shape, and an area 164, which displays a numeric value of lens thickness data. In the area 163 of a graphic display of a lens shape, side shapes, which view a right lens and a left lens from the side (cheek side), are displayed in comparison to one another when [there are] 2 [types of lenses], an as-is ordinary process off-the-shelf lens of a lens manufacturer, and a thin type process [lens] specially designed to meet with the personal specifications of an eyeglasses wearer. Further, in the lens thickness data numeric value display area 164, the lens thickness (maximum rim thickness (lens peripheral thickness), mm) and lens weight (g) of a right lens and a left lens are displayed separately for an ordinary process [lens] and a thin type process [lens].

In accordance with displaying a numeric value of lens thickness data, and a graphic of a lens external shape, it becomes possible to check whether or not there is a problem with a frame selection when a person (an eyeglasses wearer) with a prescription for a strong power lens of a minus 7 diopter, for example, selects a large sunglass use frame, and the lens peripheral thickness, when viewed by another person, is not desirable appearance-wise. Further, lens thickness differs as to the refractive index of a lens, the lens processing system, and lens design, and this effect also enables the principal cause thereof to be simulated simultaneous to frame selection and lens selection. Further, in the transmittance image of a lens portion 167 of a try-on screen 161, it is possible to perform image processing, which applies a lens power strength effect (affect), which is made visible by enlargement, reduction and the like in accordance with a refractive power that accords with the strength of a prescription lens. When granting a strength effect, clicking on the lens power strength effect check button 1610 below the try-on screen 161 displays a check mark of an ON state, as shown in the figure. Further, to cancel a strength effect, simply click on the check button 1610 once again to achieve a blank display, which is the OFF state. In accordance with furnishing a lens power strength effect, it is possible to simulate on a screen a try-on state, in which a prescription lens is actually mounted in a frame, enabling the selection of eyeglasses that accord with one's expectations. For example, it is possible to ascertain the extent to which one's eyes appear smaller or larger in accordance with the prescription lens, and a situation, in which the contour of the face appears to deviate from the lens portion 167, and the up-down location thereof, when a large lens shape frame that is wider than one's face is selected. Further, since the extent to which the eyes appear smaller will differ between a spherical surface lens and a aspherical surface lens even at the same strength, a aspherical surface lens check button 1611 is also provided. Clicking the aspherical surface lens check button 1611 to the ON state produces a strength effect [equivalent] to wearing a aspherical surface lens, and re-clicking to the OFF state produces a lens power strength effect [equivalent] to wearing a spherical surface lens.

Furthermore, clicking on the "Lens Color" button 168 makes it possible to freely select a lens color (density, kind, gradation), and apply it to the lens portion 167 of the face screen 161.

Further, in the right-side screen 162, there is an area 165 for specifying a material selection of either a plastic lens or a glass lens, and an area 166 for specifying either the refractive index or the specific gravity of the selected lens material (plastic or glass). The refractive index is classified using the expressions normal, slightly weak, weaker, weakest.

FIG. 17 is a screen that discloses the screen of FIG. 16 in more detail, and appears when the "Compute" button 169 of FIG. 69 is clicked. In an area 171 of the upper portion of the screen, a numeric value of lens thickness (mm) and lens weight (g) are displayed in table form, and in an area 172 of the lower portion of the screen, a graphic of a lens shape is displayed. In the lens thickness/weight table display area 171, items of the left side are set by classifying them as to right lens and left lens, and normal processing and thin type processing, while items of the top side are set by classifying them as to the refractive index of a lens material (refractive index sections fall into the lens thickness categories of normal, slightly thin, thinner, thinnest), and lens design conditions (classified as spherical surface and aspherical surface). Furthermore, for lens design conditions, in addition to spherical surface and aspherical surface, there are also curvature, far vision zone and near vision zone layouts of a progressive lens, and segment position of a bifocal lens, and these conditions can be added, and classified further.

Here, thin type processing refers to special eyeglasses processing, which, when the lens thickness of an non-order-made lens specification of a plus strong power prescription lens in particular is too thick in accordance with frame shape and prescription factors, provides a lens having an optimal lens thickness by redoing the optical design of a lens in line with the frame and prescription thereof. The HOYA METS online system, for example, is well known as an eyeglasses processing system that performs thin type processing like this.

Further, in the lens shape graphic display area 172, the side shape of a lens selected from the above-mentioned lens thickness/weight table is graphically displayed. The lens shape graphic display area 172 is constituted so as to enable the selection and display of 2 types of lenses (FIG. 17 [shows] a state in which lens A and lens H are selected), making possible simultaneous comparison.

Figure 18:
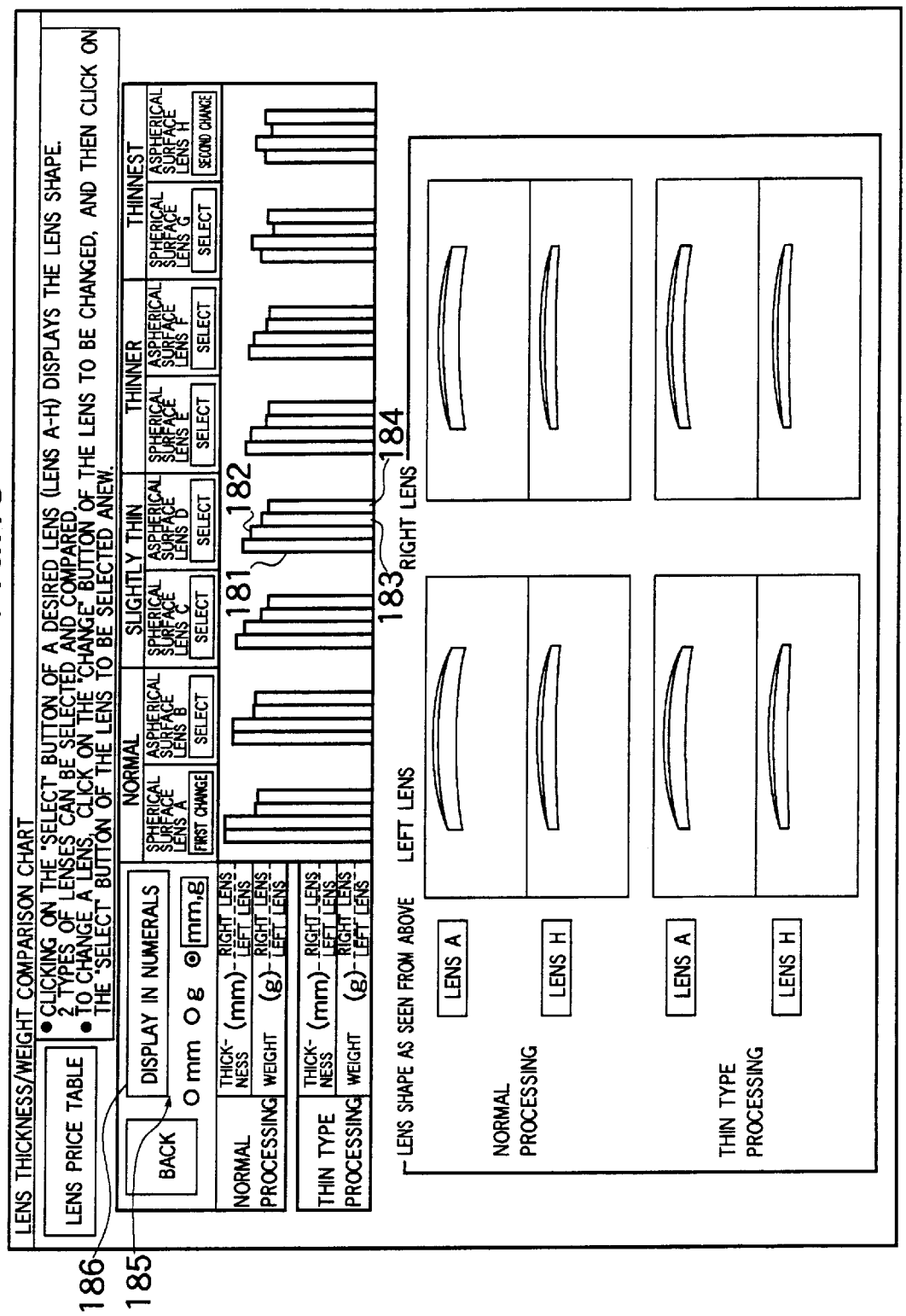

FIG. 18 is the screen that appears when the "Display Graph" button 173 of FIG. 17 is clicked using a mouse. The screen of FIG. 18 is one which changes the table display in accordance with the lens thickness and lens weight numbers of FIG. 17 to a graphic display of lens thickness and lens weight, and makes the comparison of lens thickness and lens weight visually easier to understand in accordance with a graphic display.

Figure 19:
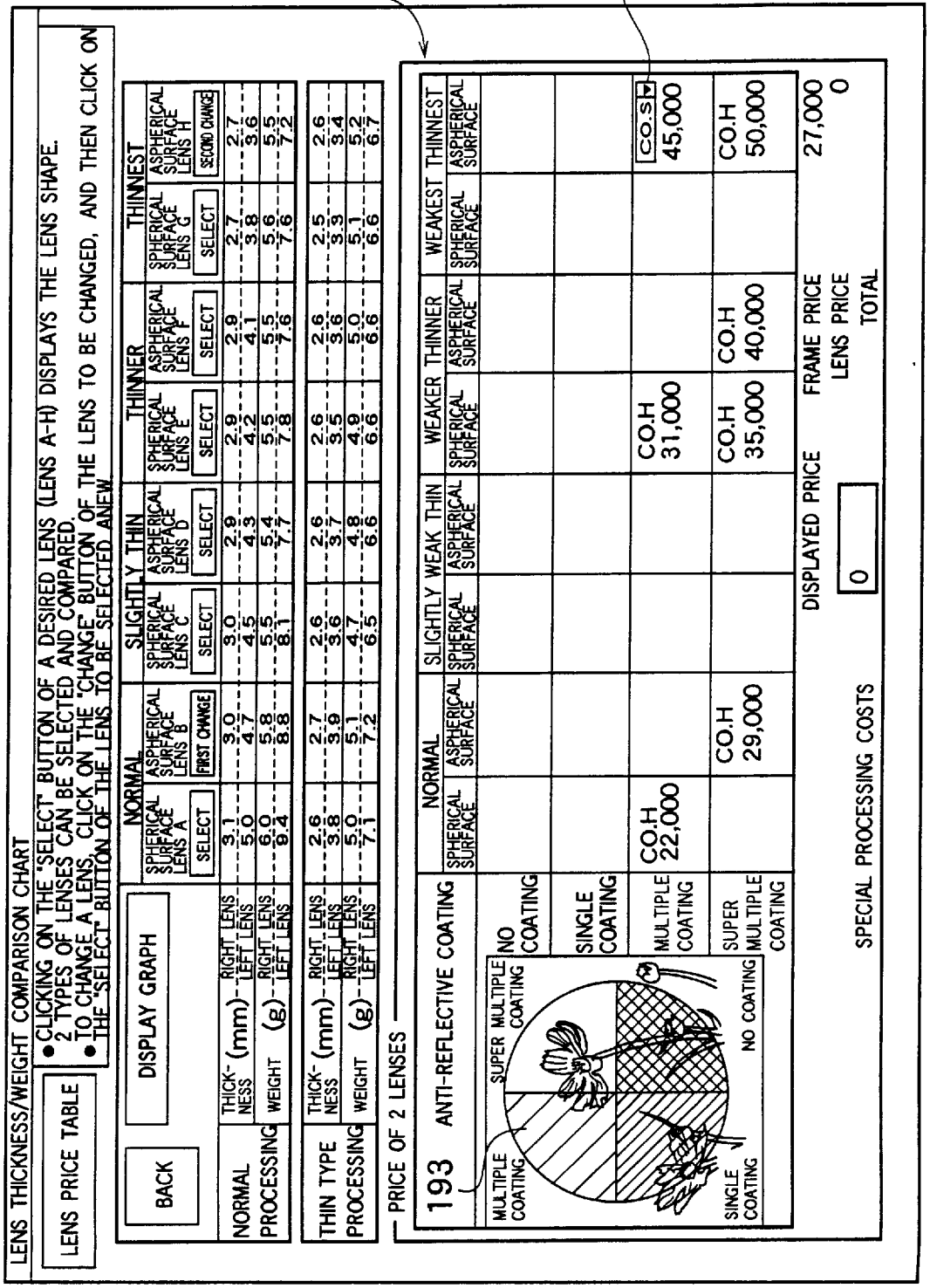

In this graphic display, normal processing thickness 181, normal processing weight 182, thin type processing thickness 183, and thin type processing weight 184 are displayed from the left in accordance with a bar graph for each lens from A–H. The height of the bar graph of these thicknesses and weights 181–184 represents a value [obtained] by adding the numeric values of left and right lenses, and in a relative manner displays the largest numeric value of the 8 types of lenses A–H as 100(%). (Furthermore, if sufficient display space can be secured in a screen, it goes without saying that lens thickness and lens weight can be graphically displayed as a height proportional to an absolute numeric value for both a right and left lens.) Further, as for the graphic display, it is possible to select any one of a comparative display of lens thickness only, a comparative display of lens weight only, or a comparative display of both lens thickness and lens weight (example shown in the figure). This selection can be performed by turning ON item mm (for a comparative display of lens thickness only), item g (for a comparative display of lens weight only), or item mm, g (for a comparative display of lens thickness and lens weight) by clicking on the button 185 located to the left of the item to be selected. Further, to return to the display in accordance with numerals shown in FIG. 17, the "Display in Numerals" button 186 can be clicked. Further, FIG. 19 is a screen that appears when the "Lens Price Table" button 174 of FIG. 17 is clicked. In the area 191 of the lower portion of the screen of FIG. 19, a lens price table, which accords with the degree of anti-reflective coating applied to a lens (no coating, single coating, multiple coating, super multiple coating) is displayed for 8 types of lenses A–H.

In this lens price table, items on the left side fall into the categories of no coating, single coating, multiple coating, and super multiple coating, and the items of the upper side are sorted in accordance with refractive index (normal, slightly thin, thinner, thinnest) similar to lens thickness/weight, and lens design conditions (spherical surface, aspherical surface). In each block of the lens price table, the manufacturer and price of the pertinent lens are displayed. For instance, as in the example shown in the figure, with regard to a multi-coated spherical surface lens with a refractive index of "thinner," the display indicates that Company H has one for 31,000 yen. Further, when a plurality of manufacturers produce lenses, for which the extent of anti-reflective coating, the lens refractive index and lens design conditions are identical (lenses that correspond to the same block of the lens price table), as shown in the figure, a pop-up menu button 192 is displayed, and clicking on button 192 displays a menu (list) of a plurality of lens manufacturers and lens prices. Further, in the left side of area 191, because transmittance and coating layer interference colors differ in accordance with the extent and type of anti-reflective coating, causing visibility to vary, this variance in visibility for the 4 [coating states], no coating, single coating, multiple coating, and super multiple coating, is displayed in an easy-to-understand manner in accordance with screen 193, which divides a circle into 4 segments.

(Step S2-1)

A method for creating a lens shape on one's own for a rimless frame is described next. In this method as well, [the steps] up to determining a basic lens shape are the same as for the above-described ordinary system, and then a basic lens shape is transformed to create an original lens shape. Furthermore, this lens shape design method is not limited to this embodiment, and can be applied to other eyeglasses (or an eyeglasses frame) try-on simulation systems.

Figure 20:

FIG. 20 is the lens shape design starting screen, and in the message area 201 of the top of the screen, "To prepare a lens shape, click on the "Prepare" button," and "To return to the chart, click on the "Back" button" are displayed. Further, the "Prepare" button 202, and the "Back" button 203 are provided above the face screen 200. Number 204 indicates an area, which displays manufacturer original basic lens shapes, and a [lens shape] approximating a preferred lens shape is selected from these basic lens shapes as a starting point for the creation of a lens shape design.

Figure 21:
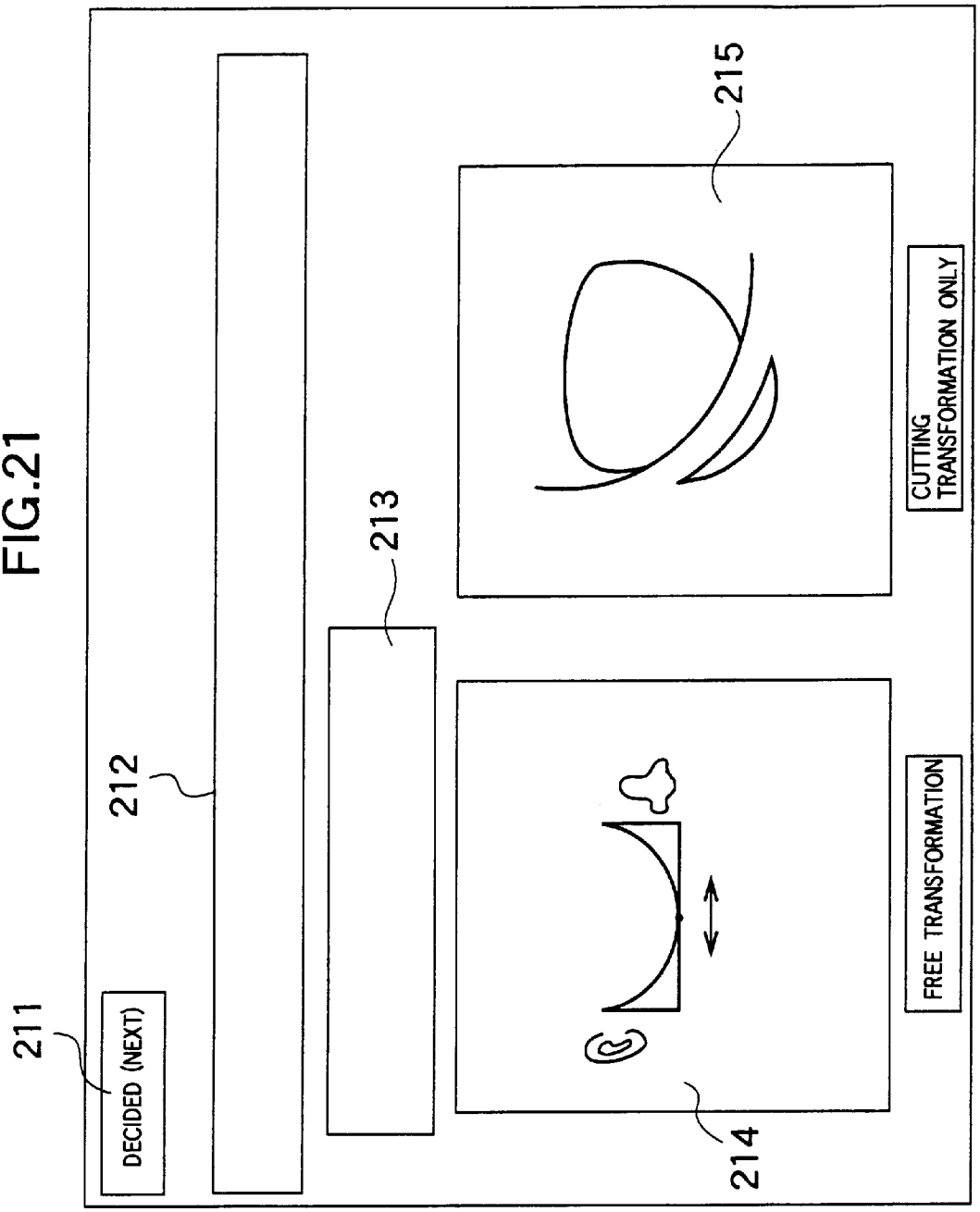

FIG. 21 is a screen for selecting which of 2 types of methods (lens shape transformation methods) will be applied to lens shape creation of this system. For this embodiment, a free transformation (in this embodiment, comprises also image transformation in a free transformation screen), and a cut transformation technique were developed. Free transformation involves creating a free shape by further systematizing a lens shape, while cut transformation involves creating a lens shape by specifying and using a cutting tool.

Figure 22:
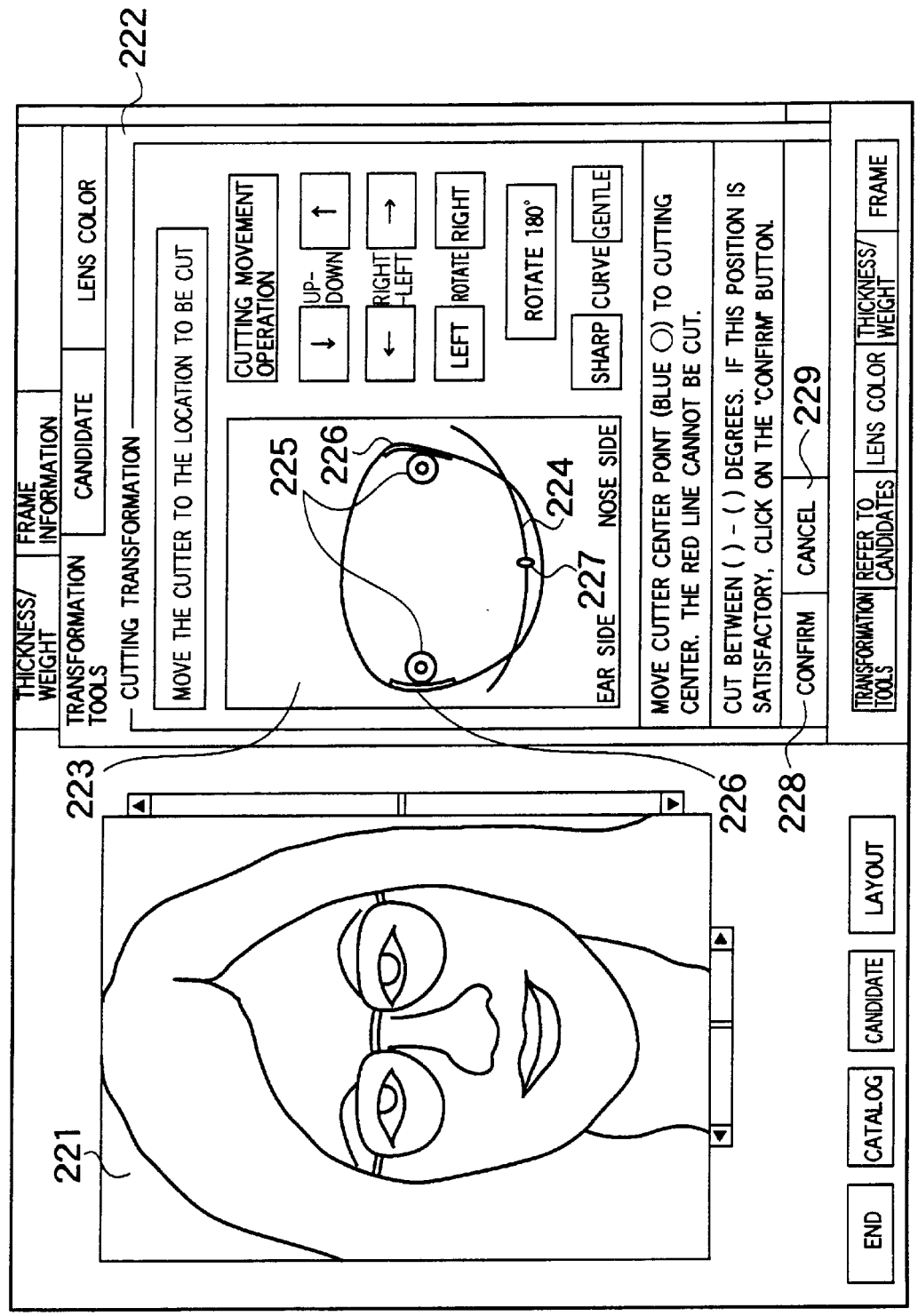

In the screen of FIG. 21, number 211 is the "Decided (Next)" button, and in the area 212 therebelow, the messages "Click on the picture of the desired transform type," and "The selected type is indicated by red characters" are displayed. Furthermore, in the area 213 therebelow, a message is displayed explaining that "Various transformation tools can be used to design a lens shape." Further, numbers 214, 215 are display portions for describing graphically and via text the respective transformation methods. FIG. 22 is a screen for performing a cutting transformation of a lens shape, an eyeglasses-wearing face screen 221 is provided on the left side, and a transformation operation screen 222 is provided on the right side. A cutting transformation screen 223, which displays a lens shape to be transformed by cutting, and a cutting tool (cutter) 224, which cuts a portion of the contour of the lens shape, is provided in the transformation operation screen 222. As for the cutting tool 224, an appropriate curved line is selected in advance so as to enable the creation of an aesthetic line as the lens shape of an eyeglasses. That is, the curved line of the cutting tool 224 is constituted so as to use a specified curved line set in advance (circular arc, parabola) as a reference curved line, and to enable the further transformation of the specified curved line in accordance with fixed conditions. The reason for stipulating a specified curved line (reference curved line) is because granting too much freedom to the curved line to be cut often times results in a frame shape that is aesthetically undesirable. So the aesthetics of an eyeglasses lens are considered in advance, and transformation work is allowed to proceed by restricting the cutting curved line of the cutting tool 224 that is used. In this embodiment, a circular arc and straight line (in this embodiment, a straight line is a circular arc which is treated as an infinite radius) are used as the lines for cutting a lens.

As for the cutting tool 224, the center position 227 of the curved line thereof is displayed as a round mark, and the location of the cutting tool 224 can be changed by moving the center position 227 of the cutting tool 224 up-down, left-right, and rotating [the cutting tool 224] left-right around the center position 227 180 degrees (vertical inversion). Furthermore, the curve of the cutting tool 224 curved line can be changed at high and low speeds in a predetermined range. Further, when using a cutting tool, the range of the angles at which cutting transformation is to be performed is displayed numerically in the lower portion of the screen in response to the movement of the cutting tool.

Further, in the cutting transformation screen 223, the ear side and nose side directions are noted, a display 225 of a fixing screw member, which affixes a frame portion to a lens face, and a lens shape contour line 226 distinguished in red at the lens contour in the vicinity of the fixing screw member thereof are depicted within a basic lens shape. And then, if the line of the cutting tool 224 intersects with this red lens shape contour line 226 area, a warning [to the effect] that transformation is not possible due to the structural relationship with the frame holding portion is automatically displayed in text form in a lower portion of the screen.

When performing a cutting operation, graphic processing of the cutting transformation of a lens shape is carried out in accordance with setting the cutting tool 224 of the cutting transformation screen 223 at a desired location of the lens shape, and clicking on the "Confirm" button 228 at the bottom of the screen 223. When cutting with a circular arc (curved line), the point of intersection portions of the circular arc of the cutting tool 224 and the contour line of the lens shape are smoothly connected by a predetermined minimal circular arc. Conversely, when cutting with a straight line, the point of intersection portions of the straight line and the contour line of the lens shape remain in the state, wherein the contour line was cut by the straight line. Further, to cancel [operation] after implementing cutting transformation, [the system] is set up so that clicking on the "Cancel" button 229 returns [the screen] to the immediately prior state (or to the initial state). Furthermore, [the system] can also be constituted so that the lens of the face screen 221 is also transformed in response to the transformation of the lens shape on the cutting transformation screen 223, making it possible to perform a lens shape transformation operation while checking the face screen 221.

Figure 23:
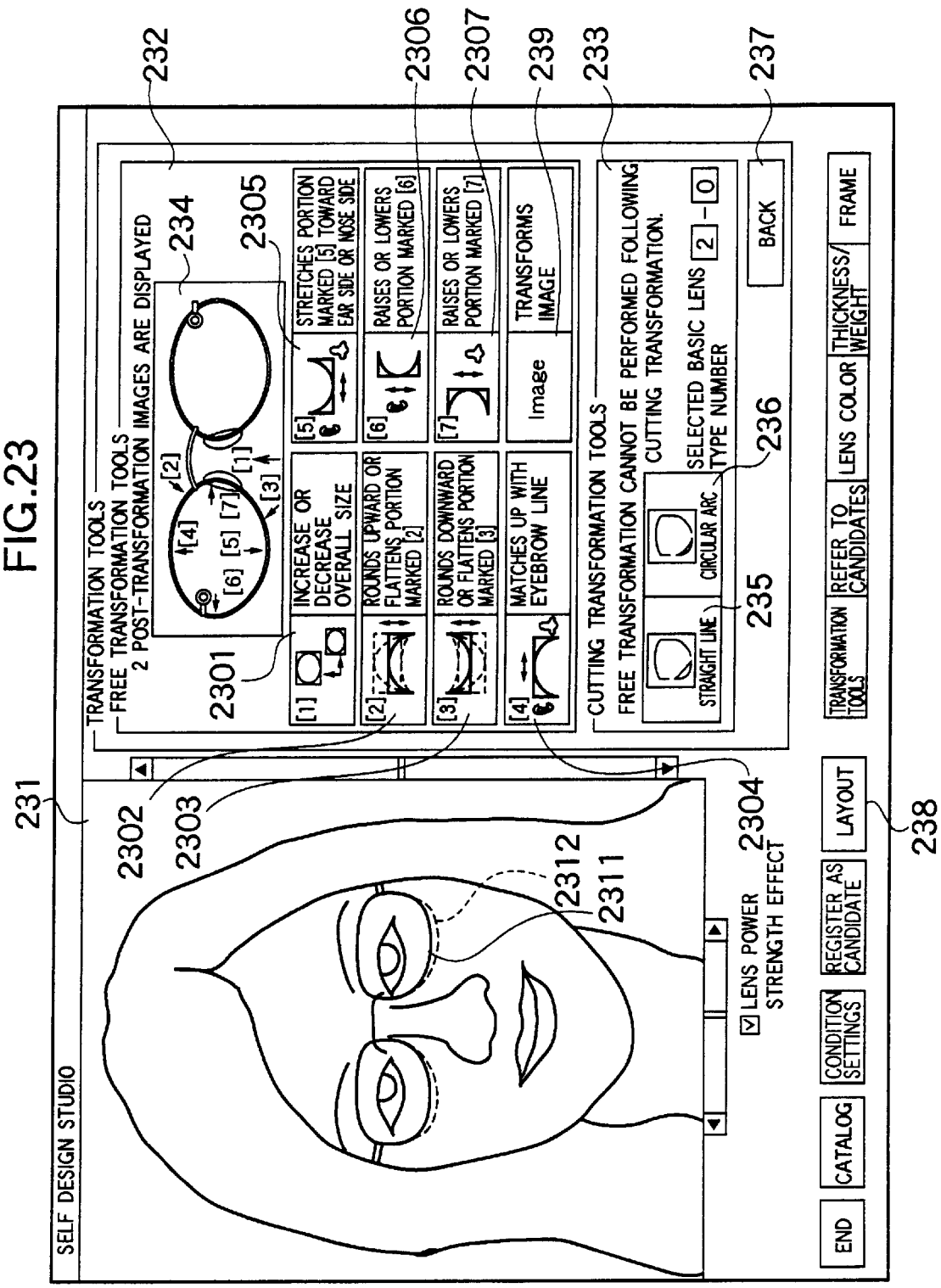

FIG. 23 is a free transformation screen, in which the free transformation of a lens shape is carried out.

An eyeglasses-wearing face screen 231 is displayed in the left side of this free transformation screen, and a free transformation tool screen 232, and a cutting transformation tool screen 233 are displayed in the right side. In the upper portion of the free transformation tool screen 232 is displayed a screen 234, which indicates with arrows [1]–[7] locations, where lens shape transformation is to be performed, and below the screen 234, transformation operation buttons 2301–2307 corresponding to [1]–[7] are provided.

Button 2301 is an operation button of enlargement/reduction transformation (lens shape size change), which either enlarges or reduces the entire lens shape in the same shape as-is. Selecting enlargement/reduction transformation by clicking on button 2301 displays below the free transformation tool screen 232 an operation screen (not shown in the figure), comprising a graphic of the lens shape contour line, an enlargement/reduction operation button, and a confirmation command button. In this enlargement/reduction transformation operation screen, the lens shape contour line is represented, respectively, as a white line in the state prior to transformation, as a red line in the state following enlargement transformation, and as a blue line in the state following reduction transformation. Furthermore, when selecting another transformation operation by clicking on buttons 2302–2307 as well, the same operation screen is displayed below the free transformation tool screen 232, and the contour line of the pre-transformation and post-transformation lens shape is similarly displayed in the operation screen as a different color.

In an enlargement/reduction transformation of a lens shape, since the nose width of the frame cannot be changed, enlargement/reduction in the left-right direction is performed in a state, wherein the apex of the nose side contour line of a lens shape does not change position in the left-right direction (X coordinate). Conversely, enlargement/reduction in the up-down direction is performed with vertical symmetry having the geometric center of the lens as the center.

Further, in the eyeglasses-wearing face screen 231 as well, the contour line of the post-transformation lens shape 2312 (displayed using a dotted line in the figure) is preview displayed in a color that differs from that of the pre-transformation contour line, making it possible to check out the post-transformation lens shape prior to confirmation. Pressing the confirmation button causes the contour line of the pre-transformation lens shape to disappear, and the post-transformation lens shape contour line is displayed. To return the lens shape to the immediately-prior transformation state, the "Back" button 237 can be pressed. In the preview display face screen 231, in accordance with an enlargement/reduction or some other free transformation of a lens shape, there are instances of affected displays, when the position of a strap or other frame portion is located to the outside of the lens and so forth, but in the post-confirmation face screen 231, [the system] is constituted so that [the position thereof] automatically moves and is displayed in a natural position. Furthermore, even in a free transformation, [the system] can be constituted so as to display side-by-side 2 face screens, in which pre-transformation and post-transformation lens shape frames, respectively, are displayed, making it possible to select a lens shape that is to one's liking in accordance with an above-described pair comparison.

Button 2302 is an operation button of an upper portion expansion/contraction transformation, which transforms the top contour line of a lens shape (portion indicated by arrow [2]) via vertical expansion or contraction. The operation for this upper portion expansion/contraction transformation moves the up-down direction positions (Y coordinates) of all points of the top contour line of a lens shape, without changing left-right direction positions (X coordinates). An upper portion expansion/contraction transformation is a transformation, which adjusts the bulge status of the top contour line upwards. In accordance with an expansion operation, the top contour line constitutes a shape that is rounded upward, and in accordance with a contraction operation, the top contour line constitutes a flat shape. In accordance with an upper portion expansion/contraction transformation or some other free transformation of a lens shape, there are instances when the position in the up-down direction of the lens shape relative to the facial image of the face screen 231 is unnatural. In such cases, pressing the "Layout" button 238 automatically moves and adjusts the lens shape in the up-down direction to a natural position. This layout function (automatic adjustment function) is performed keeping in mind the eyepoint and B size (height and width) of a post-transformation frame. Furthermore, this layout function is also applied to the above-described lens shape cutting transformation, and to the below-described lens shape image transformation.

Button 2303 is an operation button of a lower portion expansion/contraction transformation, which transforms the bottom contour line of a lens shape (portion indicated by arrow [3]) via vertical expansion or contraction. In accordance with an expansion operation, the bottom contour line constitutes a shape that is rounded downward, and in accordance with a contraction operation, the bottom contour line constitutes a flat shape.

Button 2304 is an operation button of a top vertex movement transformation. In this top vertex movement transformation, when the vertex of the top contour line of a lens shape (point indicated by arrow [4]) is moved horizontally, all points of the top contour line move in the left-right direction (X coordinates direction) in accordance with the movement of the vertex thereof, but the position in the up-down direction (Y coordinates) remains as-is, and the top contour line changes overall so as to constitute a smooth curve (for example, a curve linking together a plurality of circular arcs). Furthermore, generally speaking, matching up the top contour line of a lens shape with the eyebrow line is attractive, and ordinarily, a top contour line is made to match up with the eyebrow line.

Button 2305 is an operation button of a bottom vertex movement transformation. In this bottom vertex movement transformation, when the vertex of the bottom contour line of a lens shape (point indicated by arrow [5]) is moved horizontally, all points of the bottom contour line move in the left-right direction in accordance with the movement of the vertex thereof, but the position in the up-down direction remains as-is, and the bottom contour line changes so as to constitute an overall smooth curve.

Button 2306 is an operation button of an ear side vertex movement transformation. In this ear side vertex movement transformation, when the vertex of the ear side contour line of a lens shape (point indicated by arrow [6]) is moved vertically, all points of the ear side contour line move in the up-down direction in accordance with the movement of the vertex thereof, but the position in the left-right direction remains as-is, and the ear side contour line changes so as to constitute an overall smooth curve.

Button 2307 is an operation button of a nose side vertex movement transformation. In this nose side vertex movement transformation, when the vertex of the nose side contour line of a lens shape (point indicated by arrow [7]) is moved vertically, all points of the nose side contour line move in the up-down direction in accordance with the movement of the vertex thereof, but the position in the left-right direction remains as-is, and the nose side contour line changes so as to constitute an overall smooth curve.

Further, in the free transformation screen of FIG. 23, cutting transformation in accordance with a cutting transformation tool can also be performed on a lens shape that has undergone the above-described free transformation. To cut the lens shape with a straight line at that time, the straight line cutting tool is selected by clicking on the straight line cutting tool button 235 of the cutting tool screen 233, and to cut the lens shape with a circular arc, the circular arc cutting tool is selected by clicking on the circular arc cutting tool button 236. Furthermore, the specific operations of a cutting transformation are as described above.

Furthermore, in this embodiment, a free transformation cannot be performed on a lens shape that has undergone cutting transformation. Further, a free transformation that is capable of freely transforming a lens shape is applied to a rimless frame of a structure, which performs lens holding with only a lens face side strap, not of a structure, which performs lens holding with a lens end face side strap and a lens face side strap. However, in accordance with using the above-mentioned lens end face side strap , [the system] can be constituted so that free transformation can also be performed by specifying a freely transformable area for a rimless frame, the transformable area of which is partially restricted.

Figure 24:
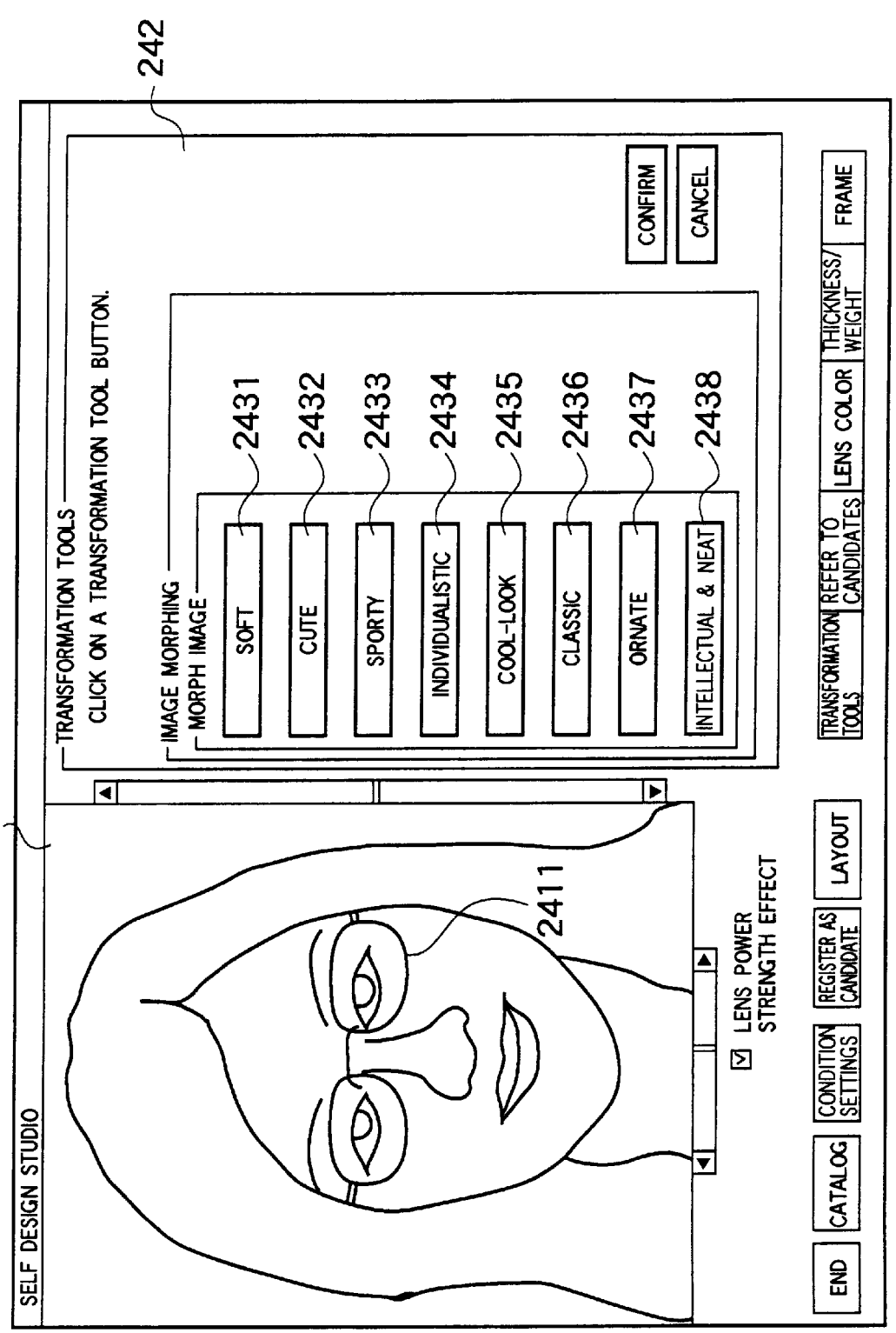
Figure 25:
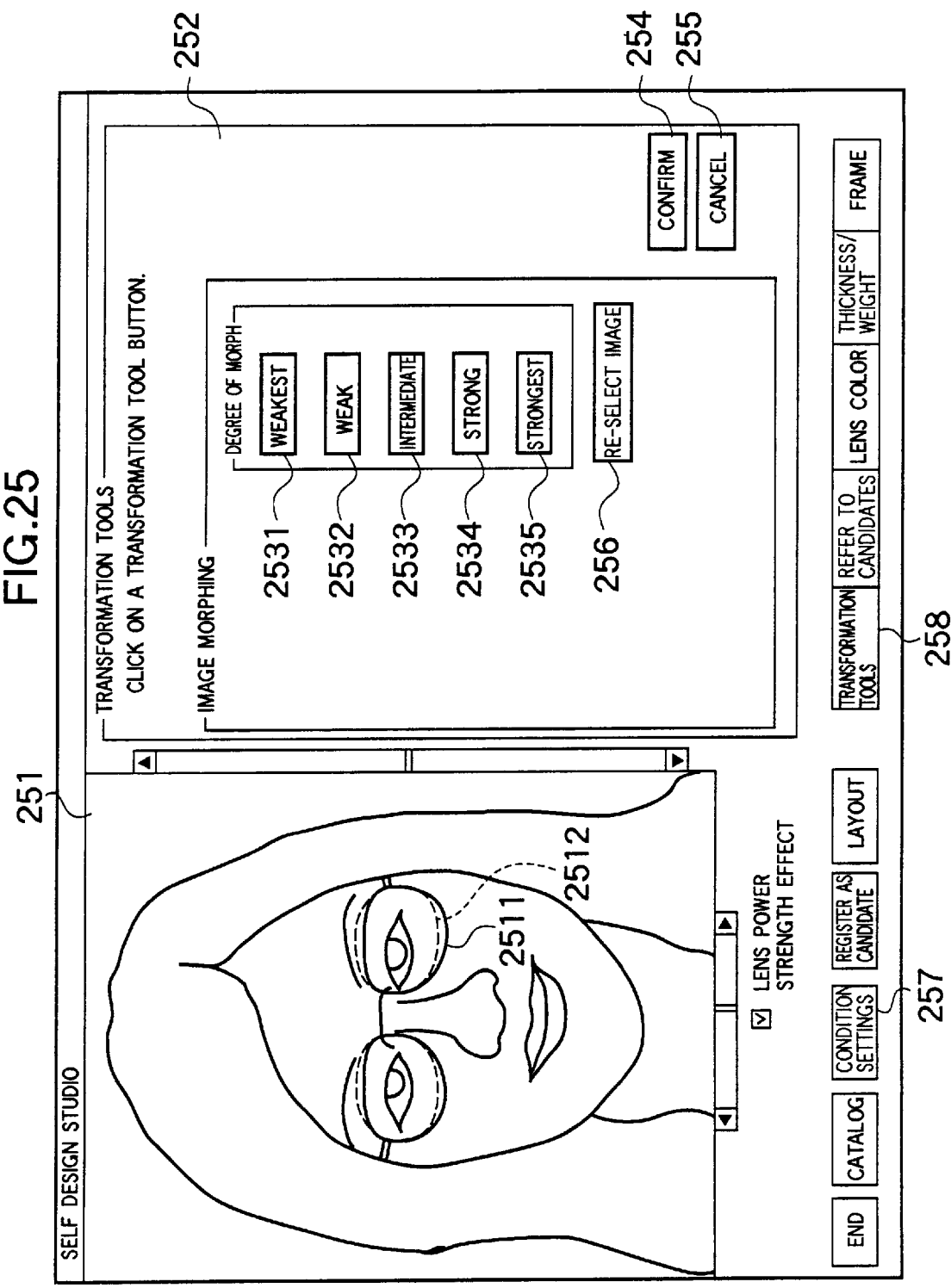

FIG. 24 is a screen that appears when the image button 239 of the free transformation screen of FIG. 23 is clicked, and is an image transformation screen for transforming the image of a lens shape. In the left side of this image transformation screen, an eyeglasses-wearing face screen 241 is displayed, and in the right side, an image transformation tool screen 242 is displayed.

A lens shape image transformation composes and transforms at a desired ratio a currently-selected lens shape, and a lens shape having a specific image (a soft feel, sporty feel, and so forth), and transforms (morphs) a lens shape to a specific image by adding specific image lens shape elements to the shape elements of a currently-selected lens shape 2411. For example, a composite shape is prepared by performing computations, which add and combine at a predetermined ratio, for example, 50% each, shape elements of a currently-selected round lens shape, with shape elements of a square lens shape having a selected specific transformation image. The image transformation thereof utilizes morphing techniques, which enable the production of a composite image that smoothly composes and transforms 2 different images at a desired ratio.

In the image transformation tool screen 242, there are provided 8 types of transformation tool buttons 2431–2438, "Soft," "Cute," "Sporty," "Individualistic," "Cool Look," "Classic," "Ornate," and "Intellectual and Neat," as transformation tool buttons for adding a transformation image (morphing image) in accordance with the concept of a specific word. As lens shapes having the specific images thereof, for example, in this embodiment a circular lens shape is used for "Soft," an elliptical lens shape is used for "Cute," an eggplant-shaped lens shape is used for "Sporty," and a rectangular lens shape is used for "Individualistic."

When transforming the image of a lens shape 2411 of a currently-selected face screen 241, from among the transformation tool buttons 2431–2438, select and click on the button, which adds a desired transformation image. In accordance with selecting the transformation tool thereof, the image transformation screen of FIG. 25 appears. In the image transformation tool screen 252 of FIG. 25, there are provided transformation intensity setting buttons 2531–2535, which make it possible to set the degree of image transformation (transformation intensity, or morphing intensity) in 5 stages (weakest, weak, intermediate, strong, strongest). The weakest setting button 2531 adds the lowest degree/ratio of shape elements of a specific image lens shape, and the strongest setting button 2535 adds the highest degree/ratio of shape elements of a specific image lens shape. Furthermore, instead of setting the degree of image transformation in stages, [the system] can be constituted to enable the degree of image transformation to be set consecutively.

Clicking on any of the transformation intensity setting buttons 2531–2535 preview displays in the eyeglasses-wearing face screen 251 a post-image transformation lens shape contour line 2512 (indicated in the figure by dotted line) using a different color from that of the currently-selected lens shape contour line 2511, making it possible to check out the post-image transformation lens shape prior to confirmation. Clicking on a transformation intensity setting button other than the currently-selected transformation intensity setting button at this time changes the transformation intensity setting, and the contour line of the post-image transformation lens shape converts to a contour line that corresponds to the post-change setting intensity.

Pressing the confirmation button 254 displays only the post-image transformation lens shape in the face screen 251. To return the lens shape to the immediately-prior transformation state, simply press the "Back" button 255. Further, to perform image transformation using an image transformation tool other than the one currently selected, since pressing the image re-select button 256 displays in the left side of the image transformation tool screen 252 the 8 types of transformation tool buttons 2431–2438 of FIG. 24, the desired transformation tool can be selected from the transformation tool buttons thereof. Image transformation can be performed once again even for a post-confirmed image transformation lens shape by re-selecting any of the 8 types of image transformation tools. Further, transforming once again the image of the above-mentioned post-free transformation lens shape, conversely, also makes it possible to further freely transform a post-image transformation lens shape. Furthermore, pressing the "Condition Setting" button 257 returns [the system] to the confirmation screen of the frame condition chart of FIG. 11, and pressing the "Transformation Tool" button 258 returns to the lens shape transformation method selection screen of FIG. 21.

(Step S6)

Figure 26:
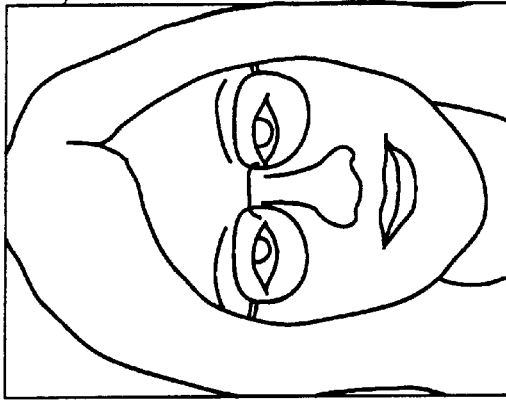

After a customer decides on a pair of eyeglasses that he wants, and determines the final eyeglasses specifications in accordance with the above-described simulations, a customer record like that shown in the screen of FIG. 26 is produced. In the customer record screen, a face screen 260 displaying the decided eyeglasses is displayed in the right side of the screen as shown in the figure, and furthermore, in area 261, customer information, in area 262, frame data, and in area 263, lens data are displayed, respectively, using characters. Further, in area 264, left-right lens layout data is displayed using graphics. As shown in the figure, the optical center 266 position, the eyepoint 267 position, the position of the segment 268 for the bifocal lens, and the position of the holes 269 for mounting lens holding metal fittings are displayed as layout data relative to the left-right lens shape 265. The segment 268 is displayed in the uncut lens processing shape, making it possible to check out how the small lens 268 should be cut in accordance with the lens shape 265. As for the customer record screen, the contents thereof are stored in a computer, and constitute an eyeglasses database, and furthermore, [the customer record screen] is also used as a confirmation screen for ultimately describing to, and confirming with the customer the contents of the decided eyeglasses.

Figure 27:
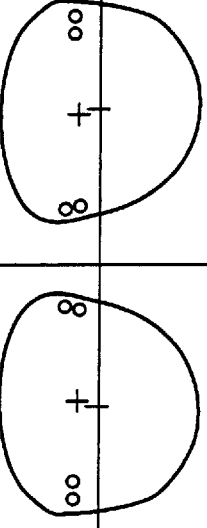

After receiving the final customer order (order placement), processing instructions required for manufacturing eyeglasses of the decided specifications are prepared. FIG. 27 is a screen showing the contents of a processing instruction sheet, and as data required for eyeglasses manufacturing, displays frame data in area 271, lens data in area 272, and lens layout data in area 273. When lens processing and so forth are consigned to an outside vendor, an order form, comprising the contents of the processing instructions sheet thereof, is sent online, or in some other manner, to the outside vendor. Further, when lens processing is performed at the eyeglasses store, the system is constituted so that lens processing is carried out by outputting to a lens edger processing instructions based on the processing instructions sheet.

Figure 28:
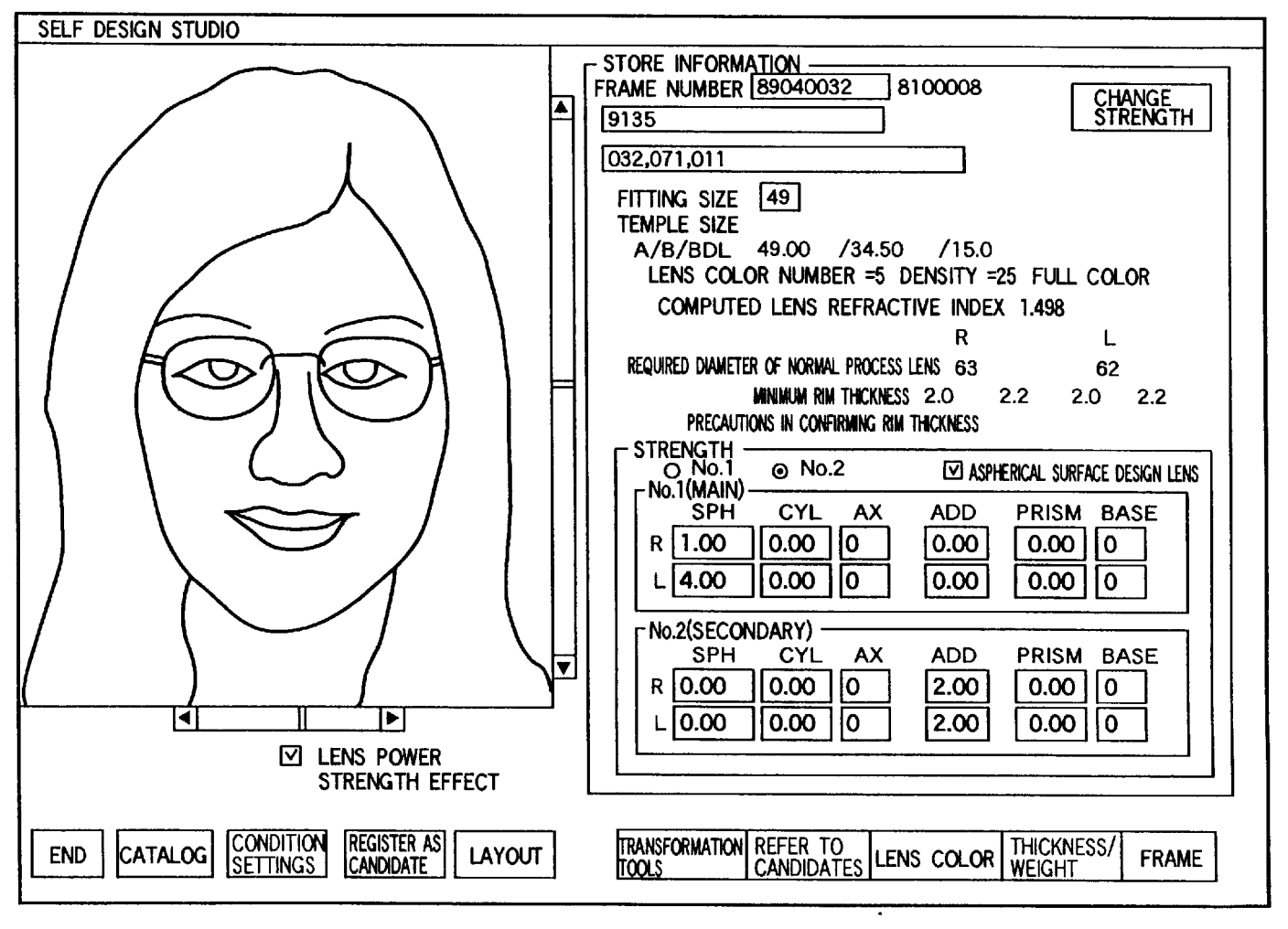

Further, with this system, clerk information, which provides all eyeglasses data to a clerk of an eyeglasses store, is prepared as shown in the screen of FIG. 28. This clerk information can also be utilized together with the above-described processing instructions sheet, for example, in lens processing, and is stored as comprehensive data, which combines customer data with processing data.

In the above-described embodiment, the example given was a case in which the eyeglasses try-on simulation system is used at an eyeglasses store. However, as is clear from the above description, since eyeglasses specifications can be determined using the frame data, lens data in the eyeglasses try-on simulation system of this embodiment, and all eyeglasses manufacturing [processes] can be ordered from an outside vendor on the basis of the eyeglasses specifications thereof, by making use of a computer-based communications network (the HOYA Online System, for example), [this system] can also be utilized by locations that have absolutely no real frames or lenses in stock. Therefore, this system can even be utilized at a clinic and the like, where resident optometrist prepare a lens prescription in accordance with an eye optometry.

Further, the layout and format of function selection buttons on the screens in the above-described embodiment are not particularly limited, and, for example, in the case of the lens shape cutting transformation screen, and free transformation screen, function selection buttons can also be displayed in accordance with a toolbar (tool box).

INDUSTRIAL APPLICABILITY

The present invention is an eyeglasses try-on simulation system, which is capable of displaying an eyeglasses-wearing composite image, which composes an eyeglasses frame image relative to a portrait image of a person, who is not wearing eyeglasses, making it possible to easily and accurately determine an eyeglasses frame and eyeglasses lens that meet the preferences of an eyeglasses wearer. Further, the eyeglasses try-on simulation system of the present invention is easy to operate, and can be operated by an ordinary eyeglasses wearer on his own, and furthermore, can be used effectively even at an eye clinic, which keeps absolutely no frames or lenses in stock.

I claim:

1. An eyeglasses try-on simulation system, characterized in that it comprises:

a function for capturing and displaying on a display screen as image data a portrait of a person, who is not wearing glasses;

a function for selecting an arbitrary eyeglasses frame from among eyeglasses frame data, comprising images of a plurality of types of eyeglasses frames stored in advance;

a function for composing an eyeglasses frame image of said selected eyeglasses frame and said portrait image, and for displaying on said display screen a composite image, on which the eyeglasses frame is simulated; and a lens selecting support function for computing, on the basis of previously-inputted lens prescription data, lens material data, and lens optical design data, a lens shape state when a lens is glazed into said selected eyeglasses frame, and for displaying the results of the computation thereof as lens shape data in accordance with either a numeric value or a graphic.

2. The eyeglasses try-on simulation system according to claim 1, characterized in that it is possible to display side-by-side on said display screen said composite image, and lens shape data in accordance with said lens selecting support function, and furthermore, it is also possible to display on said display screen a lens weight computed in accordance with said lens selecting support function.

3. The eyeglasses try-on simulation system according to claim 1, characterized in that it comprises:

a function for displaying on said display screen a lens price in accordance with the degree of lens surface treatment processing.

4. The eyeglasses try-on simulation system according to claim 1, characterized in that a plurality of lens shape data, computed in accordance with a lens selecting support function based on said lens prescription data, lens material data, and lens optical design data, can be displayed on said display screen.

5. The eyeglasses try-on simulation system according to claim 1, characterized in that a plurality of composite images, in which a plurality of selected eyeglasses frames are each simulated on said portrait, can be displayed side-by-side on said display screen.

6. The eyeglasses try-on simulation system according to claim 1, characterized in that it comprises:

a guidance screen, which acts as a guide to the overall flow of system operations, comprising said eyeglasses frame selection operation, until the desired eyeglasses are selected.

7. The eyeglasses try-on simulation system according to claim 1, characterized in that it comprises:

a measuring function for displaying by superimposing over said portrait on said display screen, on which is displayed said portrait of a person who is not wearing eyeglasses, a scale display image, by which the distance in the direction of the face width of said portrait can be read, and for obtaining face width data from this display screen.

8. The eyeglasses try-on simulation system according to claim 1, characterized in that it comprises:

a facial surface processing function in accordance with image processing relative to a portrait on said display screen.

9. The eyeglasses try-on simulation system according to claim 8, characterized in that image processing in accordance with said facial surface processing function is not performed for the eyes and mouth.

10. The eyeglasses try-on simulation system according to claim 1, characterized in that it comprises:

a review function screen for displaying and examining at least frame type, frame lens shape, and frame price, on a screen, which is selected in accordance with a function for selecting said eyeglasses frame, and which is displayed on said display screen.

11. The eyeglasses try-on simulation system according to claim 1, characterized in that it comprises:

a screen, which graphically displays lens layout data, which determines eyeglasses specifications.

12. The eyeglasses try-on simulation system according to claim 1, characterized in that it comprises:

an order placing function for processing an order placement, comprising eyeglasses frame data, and lens data processing instructions required for manufacturing eyeglasses, after eyeglasses specifications have been determined.

13. An eyeglasses try-on simulation system, characterized in that it comprises:

a function for capturing and displaying on a display screen as image data a portrait of a person, who is not wearing glasses;

a function for selecting an arbitrary eyeglasses frame from among eyeglasses frame data, comprising images of a plurality of types of eyeglasses frames stored in advance;

a function for composing an eyeglasses frame image of said selected eyeglasses frame and said portrait image, and for displaying on said display screen a composite image on which the eyeglasses frame is simulated; and a function for performing image processing, which adds, relative to the transmittance image of a lens portion of said composite image, an external appearance effect in accordance with prescription lens refraction.

14. An eyeglasses try-on simulation system, characterized in that it comprises:
a function for capturing and displaying on a display screen as image data a portrait of a person, who is not wearing glasses;
a function for selecting an arbitrary eyeglasses frame from among eyeglasses frame data, comprising images of a plurality of types of eyeglasses frames stored in advance; and
a function for composing an eyeglasses frame image of said selected eyeglasses frame and said portrait image, and for displaying on said display screen a composite image on which the eyeglasses frame is simulated,
and said eyeglasses frame data is called from a multimedia catalog, and comprises, in addition to an eyeglasses frame image of a selected eyeglasses frame, text data and voice data related to the selected eyeglasses frame.

15. An eyeglasses try-on simulation system, characterized in that it comprises:
a function for displaying on a display screen a composite image, in which an eyeglasses frame, selected from among eyeglasses frame data comprising a plurality of eyeglasses frame images, is displayed on a portrait of a person, who is not wearing eyeglasses,
and said plurality of eyeglasses frames are categorized on the basis of categories of lens shapes.

16. The eyeglasses try-on simulation system according to claim 15, characterized in that said lens shape categories are categorized in accordance with the number of circular elements constituting the contour of a lens shape.

17. The eyeglasses try-on simulation system according to claim 15, characterized in that 2 composite images wearing eyeglasses frames of different lens shapes selected from said plurality of eyeglasses frames are displayed side-by-side on said display screen, enabling an eyeglasses frame of a lens shape that is to one's liking to be selected while comparing and contrasting these 2 composite images.

18. The eyeglasses try-on simulation system according to claim 15, characterized in that a systematic diagram of a tree structure, which represents the categories of said lens shapes, is displayed on said display screen, and the 2 lens shapes being displayed in said 2 composite images are displayed in said systematic diagram so as to be recognizable.

19. The eyeglasses try-on simulation system according to claim 15, characterized in that it is constituted so that, of the plurality of said lens shapes currently selected, the 2 lens shapes that always differ the most as to the shape of the lens and/or shape-imparted image are compared and contrasted.

20. The eyeglasses try-on simulation system according to claim 15, characterized in that either images of eyeglasses frames of a plurality of basic lens shapes, which are categorized in accordance with said lens shape categories, or a plurality of composite images, in which said plurality of basic lens shape eyeglasses frames are simulated on said portraits, respectively, are displayed side-by-side on said display screen, and furthermore, in accordance with selecting either one of said images of a plurality of basic lens shape eyeglasses frames, or one of said plurality of composite images, there is displayed a composite image, on which is simulated a plurality of lens shape eyeglasses frames, which are further subdivided relative to each basic lens shape.

21. An eyeglasses try-on simulation system, characterized in that it comprises:
a function for displaying side-by-side on a display screen a composite image screen, which simulates a rimless frame on a portrait of a person, who is not wearing eyeglasses, and a transformation operation screen for transforming the lens shape of said rimless frame; and
a function for transforming, in accordance with the lens shape transformation operation in said transformation operation, the lens shape of said composite image screen in response thereto.

22. The eyeglasses try-on simulation system according to claim 21, characterized in that the transformation in accordance with said lens shape transformation operation is a cutting transformation, for transforming by cutting in accordance with either a curved line or a straight line a portion of a lens relative to said rimless frame lens shape image displayed on said transformation operation screen.

23. The eyeglasses try-on simulation system according to claim 21, characterized in that the transformation in accordance with said lens shape transformation operation comprises transformation that accompanies the movement of a vertex location of a curved line, which constitutes said lens shape contour, transformation that accompanies the expansion and contraction of said curved line, or transformation in accordance with the enlargement or reduction of said lens shape.

24. The eyeglasses try-on simulation system according to claim 21, characterized in that the transformation in accordance with said lens shape transformation operation is an image transformation, which transforms a currently selected lens shape by composing, using a desired ratio, the lens shape thereof and the lens shape of a specified image.

25. The eyeglasses try-on simulation system according to claim 21, characterized in that it comprises:
a contour correction function, which is capable of emphasis and correcting said lens shape contour line.

\* \* \* \* \*